(12) United States Patent
Haga et al.

(10) Patent No.: US 10,116,454 B2
(45) Date of Patent: Oct. 30, 2018

(54) AUTHENTICATION SYSTEM AND AUTHENTICATION METHOD

(71) Applicant: Panasonic Intellectual Property Management Co., Ltd., Osaka (JP)

(72) Inventors: Tomoyuki Haga, Nara (JP); Motoji Ohmori, Osaka (JP); Natsume Matsuzaki, Osaka (JP); Hideki Matsushima, Osaka (JP); Yuji Unagami, Osaka (JP); Manabu Maeda, Osaka (JP); Yoshihiro Ujiie, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 146 days.

(21) Appl. No.: 14/930,034

(22) Filed: Nov. 2, 2015

(65) Prior Publication Data
US 2017/0012785 A1 Jan. 12, 2017

Related U.S. Application Data

(63) Continuation of application No. PCT/JP2014/004747, filed on Sep. 16, 2014.
(Continued)

(51) Int. Cl.
*H04L 9/32* (2006.01)
*G06F 21/44* (2013.01)
(Continued)

(52) U.S. Cl.
CPC ............ *H04L 9/3268* (2013.01); *G06F 21/33* (2013.01); *G06F 21/44* (2013.01); *H04L 9/14* (2013.01);
(Continued)

(58) Field of Classification Search
CPC . H04L 9/3268; H04L 9/14; H04L 9/30; H04L 63/06; H04L 63/0823; G06F 21/33; G06F 21/44
See application file for complete search history.

(56) References Cited

U.S. PATENT DOCUMENTS

| | | | |
|---|---|---|---|
| 2005/0071631 A1* | 3/2005 | Langer | H04L 9/0833 713/156 |
| 2007/0220616 A1* | 9/2007 | Oh | G06F 21/10 726/30 |

(Continued)

FOREIGN PATENT DOCUMENTS

EP    2034661    3/2009

OTHER PUBLICATIONS

The Extended European Search Report dated Oct. 24, 2016 for European Patent Application No. 14871128.6.
(Continued)

*Primary Examiner* — Oleg Korsak
*Assistant Examiner* — Devin E Almeida
(74) *Attorney, Agent, or Firm* — Greenblum & Bernstein, P.L.C.

(57) ABSTRACT

In an authentication method according to the present disclosure, (1) a device transmits device history information with a CRL added thereto (hereinafter, device history information with added CRL) to a controller, (2) the controller transmits the device history information with added CRL to a server, and (3) if the version of the CRL included in the device history information with added CRL is older than the version of the CRL stored on the server, the server judges that the controller is unauthorized.

8 Claims, 30 Drawing Sheets

Related U.S. Application Data

(60) Provisional application No. 61/916,521, filed on Dec. 16, 2013.

(51) Int. Cl.
*G06F 21/33* (2013.01)
*H04L 29/06* (2006.01)
*H04L 9/14* (2006.01)
*H04L 9/30* (2006.01)

(52) U.S. Cl.
CPC ............. *H04L 9/30* (2013.01); *H04L 63/06* (2013.01); *H04L 63/0823* (2013.01)

(56) References Cited

U.S. PATENT DOCUMENTS

| | | | |
|---|---|---|---|
| 2007/0234045 A1* | 10/2007 | Ishiyama | H04L 63/0823 713/158 |
| 2008/0010451 A1* | 1/2008 | Holtzman | H04L 9/3228 713/158 |
| 2009/0187983 A1* | 7/2009 | Zerfos | H04L 63/0823 726/10 |
| 2012/0054487 A1* | 3/2012 | Sun | G06F 21/64 713/158 |
| 2014/0129829 A1* | 5/2014 | Unagami | H04L 9/3268 713/158 |

OTHER PUBLICATIONS

International Search Report of PCT application No. PCT/JP2014/004747 dated Dec. 22, 2014.
"Wi-Fi Certified Wi-Fi Protected Setup" Wi-Fi Alliance, Dec. 2010.
Atsuko Miyaji et al., "Information Security" Ohm-sha pp. 140-147, Oct. 25, 2003 (Partial Translation).
"Suite B Implementer's Guide to FIPS 186-3(ECDSA)" Feb. 3, 2010.
Elaine Barker et al., "Recommendation for Pair-Wise Key Establishment Schemes Using Discrete Logarithm Cryptography" NIST Special Publication 800-56A Revision 2.
D. Forsberg et al., "Protocol for Carrying Authentication for Network Access (PANA)", RFC5191, May 2008.

* cited by examiner

FIG. 3
| DEVICE ID | CERTIFICATE ID |
|---|---|
| DEVICE ID1 | CERTIFICATE ID (M1) |
| DEVICE ID2 | CERTIFICATE ID (M2) |
| DEVICE ID3 | CERTIFICATE ID (M3) |
| . . . | . . . |
FIG. 4
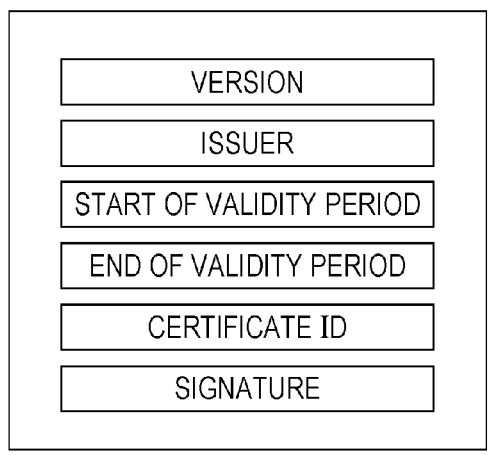
FIG. 5
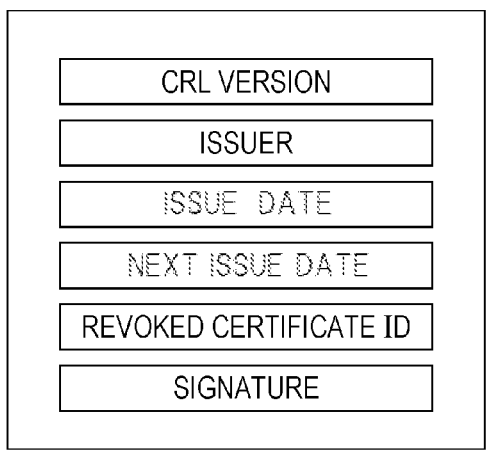

FIG. 7

| CONTROLLER ID | CERTIFICATE ID |
|---|---|
| CONTROLLER ID1 | CERTIFICATE ID(C1) |
| CONTROLLER ID2 | CERTIFICATE ID(C2) |
| ... | ... |

FIG. 9

| CONTROLLER ID | CONTROLLER CERTIFICATE ID | DEVICE ID | CERTIFICATE OF DEVICE | HISTORY INFORMATION |
|---|---|---|---|---|
| CONTROLLER ID1 | CERTIFICATE ID (C1) | DEVICE ID1 | CERTIFICATE ID (M1) | HISTORY INFORMATION 1 |
| | | DEVICE ID2 | CERTIFICATE ID (M2) | HISTORY INFORMATION 2 |
| | | DEVICE ID3 | CERTIFICATE ID (M3) | HISTORY INFORMATION 3 |
| ⋮ | ⋮ | ⋮ | ⋮ | ⋮ |

FIG. 20

| CONTROLLER ID | CERTIFICATE ID | SHARED KEY |
|---|---|---|
| CONTROLLER ID1 | CERTIFICATE ID (C1) | 96385··· |
| CONTROLLER ID2 | CERTIFICATE ID (C2) | 19283··· |
| ··· | ··· | ··· |

FIG. 21

| DEVICE ID | CERTIFICATE ID | SHARED KEY |
|---|---|---|
| DEVICE ID1 | CERTIFICATE ID (M1) | 01234··· |
| DEVICE ID2 | CERTIFICATE ID (M2) | 98765··· |
| DEVICE ID3 | CERTIFICATE ID (M3) | 19283··· |
| ··· | ··· | ··· |

| | 600 | |
|---|---|---|
| 601 | 602 | 603 |
| TIME | OPERATION HISTORY DETAILS | USER ID |
| 12/1/2013 12:00 | OPERATION 1 USED | USER A |
| 12/2/2013 18:00 | OPERATION 2 USED | USER B |
| ... | ... | ... |

FIG. 28

| CONTROLLER ID | UNAUTHORIZED CONTROLLER DETERMINATION RESULT |
|---|---|
| CONTROLLER ID1 | AUTHORIZED |
| CONTROLLER ID2 | UNAUTHORIZED |

AUTHENTICATION SYSTEM AND AUTHENTICATION METHOD

BACKGROUND

1. Technical Field

The present disclosure relates to an authentication system that enables a device and controller to be safely connected.

2. Description of the Related Art

In recent years, home electric appliances and audiovisual devices have come to be connected to networks, and there is anticipation for services using various types of history information collected therefrom to the cloud. In this arrangement, a controller is installed in the home, and transmission of history information from the home electric appliance devices to a manufacturer's server is relayed through the controller. Setting the connection between the controller and the home electrical appliances so as to be safe enables communication within the home to be controlled, and leakage of information over wireless communication and connection to the in-home network by spoofing to be prevented.

To this end, the Wi-Fi Alliance has conventionally set forth a standard to facilitate connection among devices, called Wi-Fi Protected Setup (Wi-Fi Alliance, "Wi-Fi CERTIFIED Wi-Fi Protected Setup: Easing the User Experience for Home and Small Office Wi-FiR Networks (2010)", [online], December 2010, [Searched Jun. 24, 2014], Internet <URL: http://www.wi-fi.org/ja/file/wi-fi-certified-wi-fi-protected-setup%E2%84% A2-easing-the-user-experience-for-home-and-small-office-wi>). However, in Wi-Fi wireless connection, this only guarantees interconnection among devices at an access point of devices and home electric appliances, that is equivalent to a controller, and does not guarantee whether a connecting device is valid or not.

Usage of the Public Key Infrastructure (PKI) to authenticate the validity of devices has been conventionally known ("IT Text Information Security" compiled by Atsuko Miyaji/Hiroaki Kikuchi, published by Ohmsha, October 2003 (hereinafter, Miyaji et al)). Authentication based on PKI guarantees the validity of devices by authenticating that an entity (home electric appliance or controller) has a secret key and a public key certificate issued by a certificate authority. Once there is an occurrence of leakage of a secret key or the like regarding a public key certificate, the public key certificate needs to be revoked in order to prevent unauthorized use of the public key certificate. A representative way to revoke a public key certificate is a Certificate Revocation List (CRL) which is a list of certificate revocations (Miyaji et al). A CRL is a list of revoked public key certificates, with IDs and the like of revoked public key certificates affixed with the signature of the certificate authority that has issued the public key certificate, and distributed. The entity such as the home electric appliance or controller verifies whether the public key certificate of another entity to which it is to connect is not listed in the CRL. Accordingly, the newest CRL needs to be used.

For additional information, see D. Forsberg et al., RFC5191, "Protocol for Carrying Authentication for Network Access (PANA)", [online], May 2008, Internet Engineering Task Force, [accessed Jun. 24, 2014], Internet <URL:http://www.rfc-editor.org/rfc/pdfrfc/rfc5191.txt.pdf>.

SUMMARY

One non-limiting and exemplary embodiment provides further improvements to the authentication systems of the related art discussed above.

In one general aspect, the techniques disclosed here feature an authentication method in an authentication system including a server, a device, and a first controller that controls the device. The authentication method includes:
the device storing a first certificate revocation list and device history information;
the server storing a second certificate revocation list;
the device transmitting to the first controller device history information with added authentication information including the device history information and first age-identifying information of the first certificate revocation list;
the first controller transmitting to the server the device history information with added authentication information; and
the server comparing first age-identifying information included in the first certificate revocation list from the device history information with added authentication information to second age-identifying information included in the second certificate revocation list, and if the first age-identifying information is indicated to be older than the second age-identifying information, judging that the first controller is unauthorized.

It should be noted that general or specific embodiments may be implemented as a system, a method, an integrated circuit, a computer program, a storage medium, or any selective combination thereof.

According to the present disclosure, further improvements may be realized.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 3 is a diagram illustrating an example of a connection device management table of the controller according to the first embodiment;

FIG. 4 is a diagram illustrating an example of a public key certificate according to the first embodiment;

FIG. 5 is a diagram illustrating an example of a CRL according to the first embodiment;

FIG. 7 is a diagram illustrating an example of a connection controller management table of the device according to the first embodiment;

FIG. 9 is a diagram illustrating an example of a device information management table of the manufacturer server according to the first embodiment;

FIG. 20 is a diagram illustrating an example of a connection controller management table of the device according to the second embodiment;

FIG. 21 is a diagram illustrating an example of a connecting device management table of the controller according to the second embodiment;

FIG. 28 is a configuration diagram of CRL determination result information according to the third embodiment;

DETAILED DESCRIPTION

Figure 1:
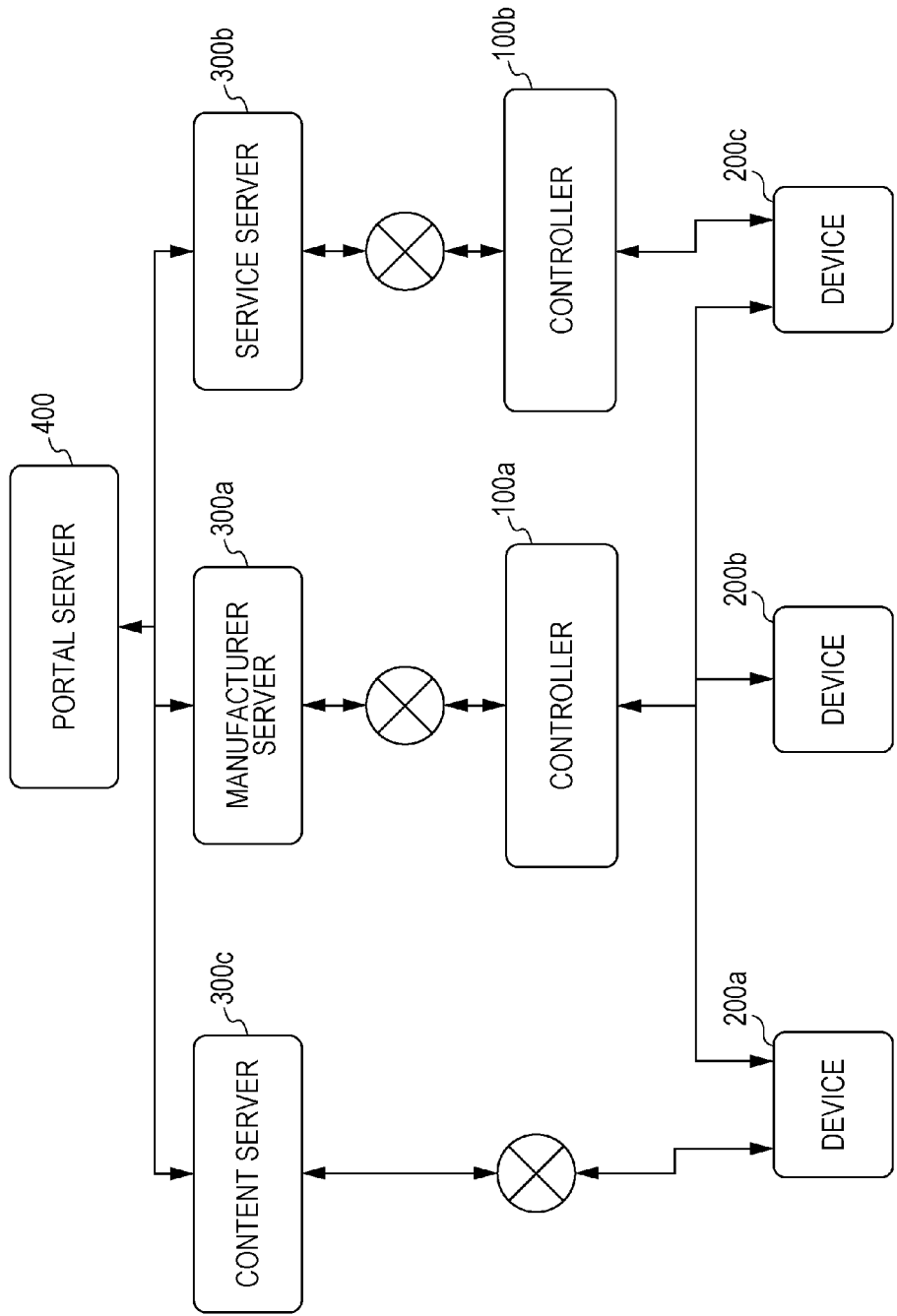
FIG. 1 is an overall configuration diagram of an authentication system according to a first embodiment.

Underlying Knowledge Forming Basis of the Present Disclosure

In a case where a home electric appliance connects only to one controller, the home electric appliance acquires the CRL via the controller. At this time, if the controller is an unauthorized device, even of the public key certificate is listed in the CRL, the home electric appliance will authenticate the controller as an authorized device unless the controller distributes a CRL, in which the public key certificate of the controller is listed, to the home electric appliance.

Based on the above observation, the present inventors arrived at the aspects of the present disclosure.

An authentication method according to an aspect of the present disclosure is an authentication method in an authentication system including a server, a device, and a first controller that controls the device, the authentication method including:

the device storing a first certificate revocation list and device history information; the server storing a second certificate revocation list;

the device transmitting to the first controller device history information with added authentication information including the device history information and first age-identifying information of the first certificate revocation list;

the first controller transmitting to the server the device history information with added authentication information; and the server comparing first age-identifying information included in the first certificate revocation list from the device history information with added authentication information to second age-identifying information included in the second certificate revocation list, and if the first age-identifying information is indicated to be older than the second age-identifying information, judging that the first controller is unauthorized.

Consequently, even when the controller does not distribute an up-to-date certificate revocation list to the device, the server references information about the certificate revocation list attached to the device history information from the device, and thus is able to judge that the controller is unauthorized.

In addition, an unauthorized controller not registered in the certificate revocation list may be detected, and unauthorized control of device via the unauthorized controller may be prevented reliably.

Furthermore, in an authentication method according to an aspect of the present disclosure, when the server judges that the first controller is unauthorized, the server transmits the second certificate revocation list to a second controller connected to the device, the second controller transmits the second certificate revocation list to the device, and the device updates the first certificate revocation list with the second certificate revocation list.

Consequently, the device is configured to be connected to a first controller and a second controller, so that even if the first controller is unauthorized, the server is able to distribute an up-to-date certificate revocation list to the device via the second controller, and cause the certificate revocation list to be updated.

Furthermore, in an authentication method according to an aspect of the present disclosure, when the server judges that the first controller is unauthorized, the server records unauthorized determination information indicating that the first controller is unauthorized, and when there is a process request from the first controller, references the unauthorized determination information, and does not perform the process request from the first controller.

Consequently, unauthorized control of the device via an unauthorized controller may be prevented even during the period before a newly discovered unauthorized controller is registered in the certificate revocation list.

Furthermore, in an authentication method according to an aspect of the present disclosure, when the server judges that the first controller is unauthorized, the server transmits the second certificate revocation list to the device, and the device updates the first certificate revocation list with the second certificate revocation list.

Consequently, when the first controller is judged to be unauthorized, an up-to-date certificate revocation list may be distributed from the server to the device without going through the first controller, and the certificate revocation list in the device may be updated.

The authentication system according to embodiments of the present disclosure will be described below with reference to the drawings. Note that the embodiments described below indicate a preferred specific example of the present disclosure. That is to say, values, shapes, materials, components, placement and connection arrangement of components, steps, orders of steps, and so forth in the following embodiments are only exemplary, and are not intended to restrict the present disclosure. The present disclosure is defined based on the scope of the Claims. Accordingly, components in the following embodiments which are not included in an independent Claim of the present disclosure indicating the highest concept are described as being components which are not necessarily indispensable in achieving solving of the problem but make up a more preferable form.

First Embodiment

1. System Configuration

An authentication system 10 according to the present disclosure will be described here as an embodiment of the present disclosure, with reference to the drawings.

1.1 Overall Configuration of Authentication System 10

FIG. 1 is a diagram illustrating the overall configuration of the authentication system 10 according to the present disclosure. The authentication system 10 is configured including controllers 100, devices 200, servers 300, and a portal server 400. The controllers 100a and 100b are devices having functions of controlling devices. The controllers 100a and 100b also have functions of connecting to servers, transmitting information of home electric appliances to the server, receiving control requests from the servers, controlling the home electric appliances, and so forth. The devices 200a through 200c are home electric appliances and housing facility devices that collect device history information, such as televisions, recorders, air conditioners, refrigerators, batteries, and so forth. The servers 300a through 300c are a content server that distributes content, a manufacture server of a manufacturer that manufactures home electric appliances, and a service server of a service provider that provides services. As a specific example, history information of a device in the home is transmitted to the controller, and the control transmits history information of the device to the manufacturer server. Also, in a case where the service server is an electric power company, the electric power company connects to the controller via a home smart meter (omitted from illustration). The controller controls devices in the home based on electric power information from the electric power company, and suppresses consumption of electric power within the home.

1.2 Configuration of Controller 100

Figure 2:
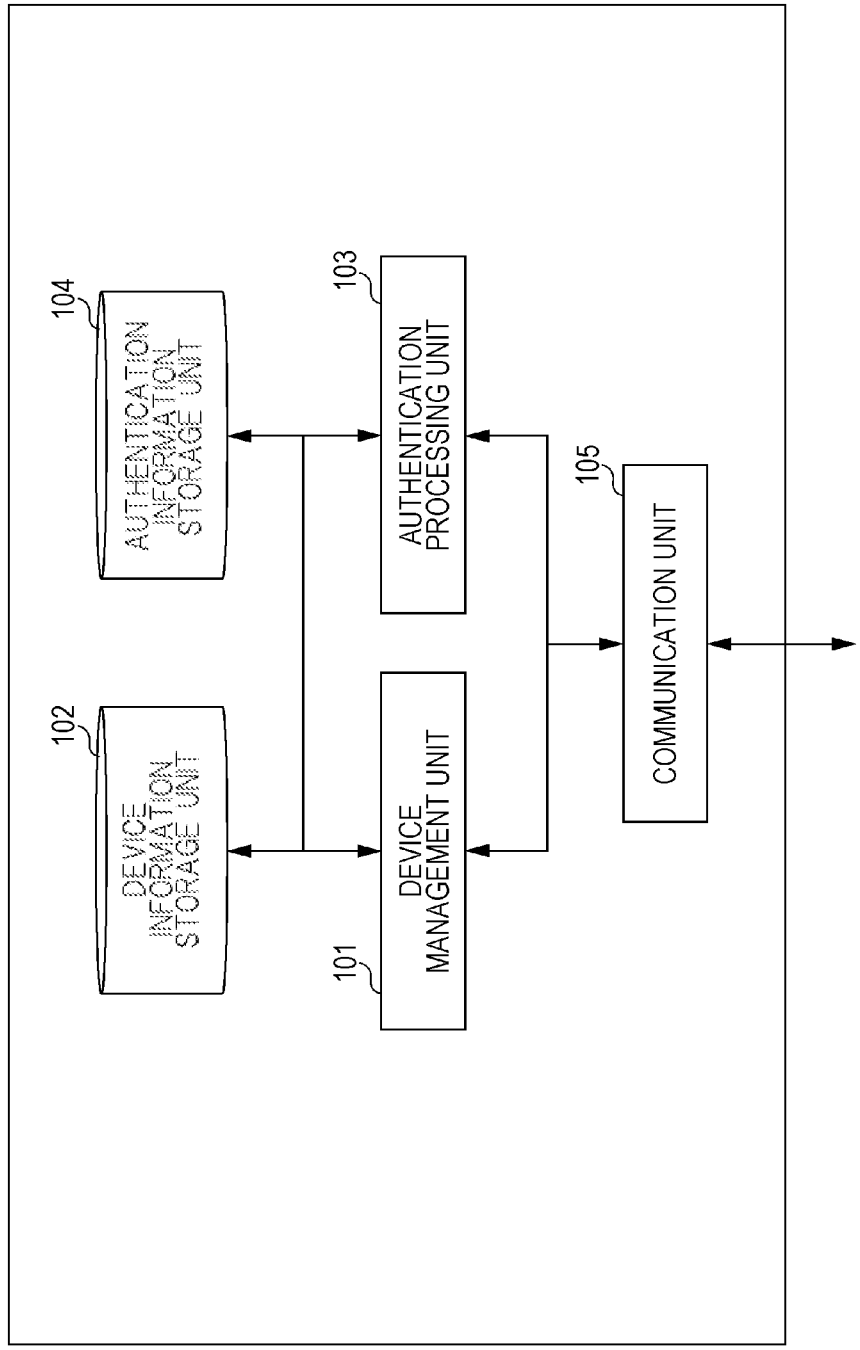
FIG. 2 is a configuration diagram of a controller according to the first embodiment.

FIG. 2 is a configuration diagram of the controller 100a. The controller 100a is configured including a device management unit 101, a device information storage unit 102, an authentication processing unit 103, an authentication information storage unit 104, and a communication unit 105. The controller 100b also is of the same configuration.

The device management unit 101 manages devices connected to the controller. In a case where there is a connection request from a device, the device management unit 101 transmits the public key certificate received from the device to the authentication processing unit 103, and requests authentication processing. The device management unit 101 receives the authentication results from the authentication processing unit 103. In a case where authentication has been successful, the device management unit 101 registers the device ID and certificate ID in a connecting device management table held at the device information storage unit 102.

The device information storage unit 102 manages information of devices connecting to the controller. FIG. 3 is a diagram illustrating an example of a device information management table which the device information storage unit 102 holds. The device information management table records device IDs and certificate IDs of the public key certificates that the devices hold.

The authentication processing unit 103 performs authentication processing with the devices. Also, upon receiving an authentication request from the device management unit 101 along with a public key certificate of a device, the authentication processing unit 103 acquires the CRL recorded in the authentication information storage unit 104, and verifies whether the certificate ID of the public key certificate of the device is recorded in the CRL. The authentication processing unit 103 also verifies the signature of the public key certificate using the public key (omitted from illustration) of the portal server, which is the certificate authority. The authentication processing unit 103 also generates a random number and transmits the random number to the device. The authentication processing unit 103 verifies a signature of the random number received from the device. In a case where any one of the verifications fails, the authentication processing unit 103 determines that the device is an unauthorized device.

The authentication information storage unit 104 holds a key pair of secret key and public key certificate, and the CRL. The secret key, public key certificate, and CRL are embedded in the authentication information storage unit 104 when shipping. FIG. 4 is a diagram illustrating an example of the configuration of a public key certificate. The public key certificate is configured including version, issuer, start and end of validity period, certificate ID, and signature of the portal server, which is the certificate authority. FIG. 5 is a diagram illustrating an example of the configuration of a CRL. The CRL is configured including CRL version, issuer, issue date, next issue date, revoked certificate ID, and signature of the portal server, which is the certificate authority. The certificate ID is not restricted to being one; multiple certificate IDs may be included.

The communication unit 105 communicates with the device 200, manufacturer server 300a, and service server 300b. The communication unit 105 communicates with the server via Secure Socket Layer (SSL) communication. Certificates necessary for SSL communication are recorded at the communication unit 105.

1.3 Configuration of Device 200

Figure 6:
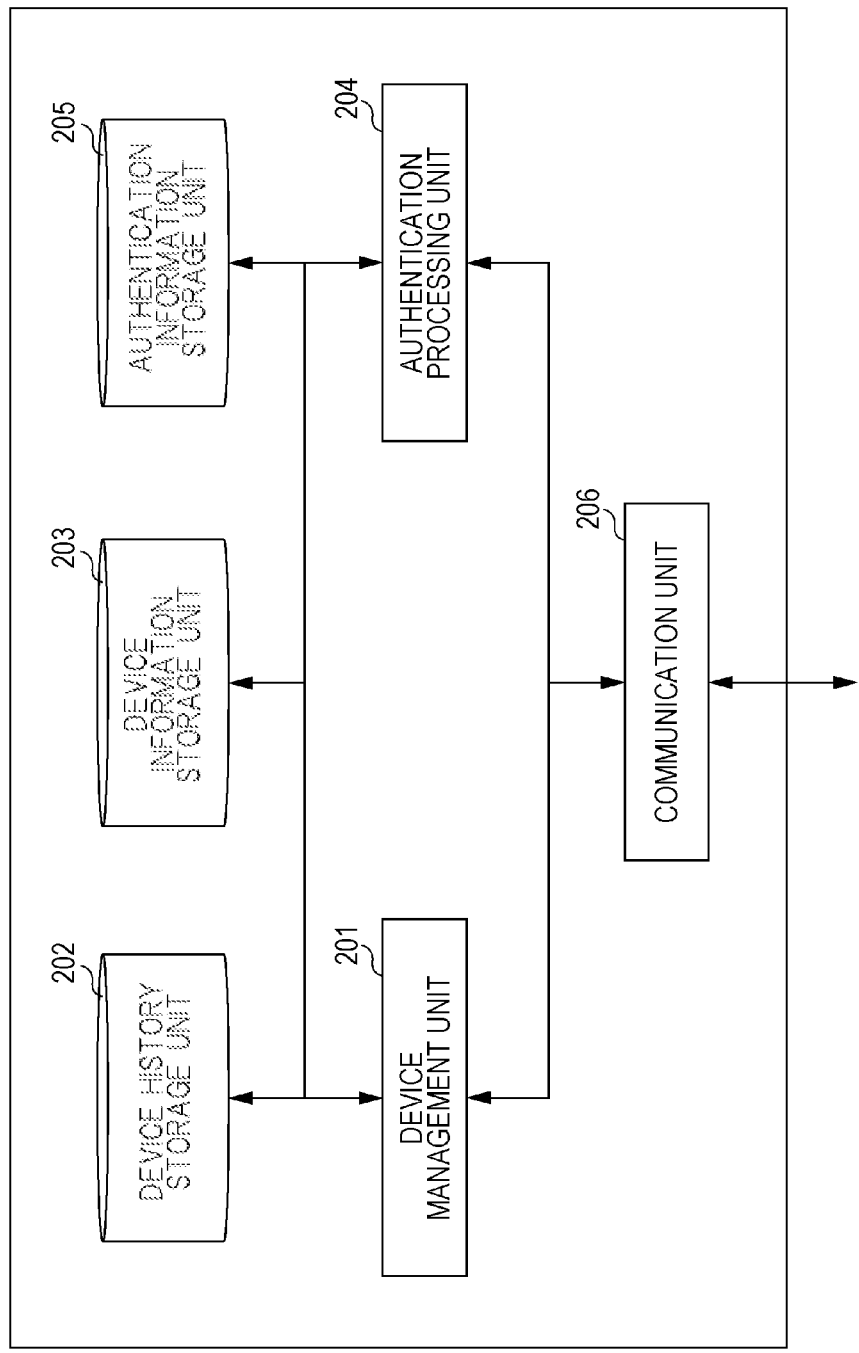
FIG. 6 is a configuration diagram of a device according to the first embodiment.

FIG. 6 is a configuration diagram of the device 200. The device 200 includes a device management unit 201, a device history storage unit 202, a device information storage unit 203, an authentication processing unit 204, an authentication information storage unit 205, and a communication unit 206.

The device management unit 201 transmits a connection request to the controller 100 when starting up. In a case of connecting to the content server 300c instead of connecting to the controller, the communication unit 206 performs SSL communication with the content server 300c. The device management unit 201 transmits an authentication request to the authentication processing unit 204 upon receiving a public key certificate from the controller. The device management unit 201 receives the results of authentication from the authentication processing unit 204. In a case where authentication is successful, the device management unit 201 registers the controller ID and certificate ID in a connecting controller management table held at the device information storage unit 203. The device management unit 201 also periodically or non-periodically transmits device history recorded at the device history storage unit 202 to the server via the controller. Note that in a case where direct connection has been made to the content server, transmission is made to the server without going through the controller.

The device history storage unit 202 acquires and records operation history of the device.

The device information storage unit 203 manages information of the controller 100 connecting to the device. FIG. 7 is a diagram illustrating an example of a connecting controller management table which the device information storage unit 203 holds. The connecting controller management table records controller IDs and certificate IDs of the public key certificates which the controllers hold.

The authentication processing unit 204 performs authentication processing with the controller. Also, upon receiving an authentication request from the device management unit 201 along with a public key certificate, the authentication processing unit 204 acquires the CRL recorded in the authentication information storage unit 205, and verifies whether the certificate ID of the public key certificate of the controller is recorded in the CRL. The authentication processing unit 204 also verifies the signature of the public key certificate using the public key (omitted from illustration) of the portal server, which is the certificate authority. The authentication processing unit 204 also generates a random number and transmits the random number to the controller. The authentication processing unit 204 verifies a signature of the random number received from the controller. In a case where any one of the verifications fails, the authentication processing unit 204 determines that the controller is an unauthorized device.

The authentication information storage unit 205 holds a key pair of secret key and public key certificate, and the CRL. The key pair of the secret key and public key certificate, and the CRL are embedded in the authentication information storage unit 205 when shipping the device. The public key certificate and CRL are of the same configuration as the public key certificate and CRL of the controller, so description will be omitted here.

The communication unit 206 communicates with the controller 100 and content server 300c. The communication unit 206 communicates with the content server via SSL communication. Certificates necessary for SSL communication are recorded at the communication unit 206.

1.4 Configuration of Manufacturer Server 300a

Figure 8:
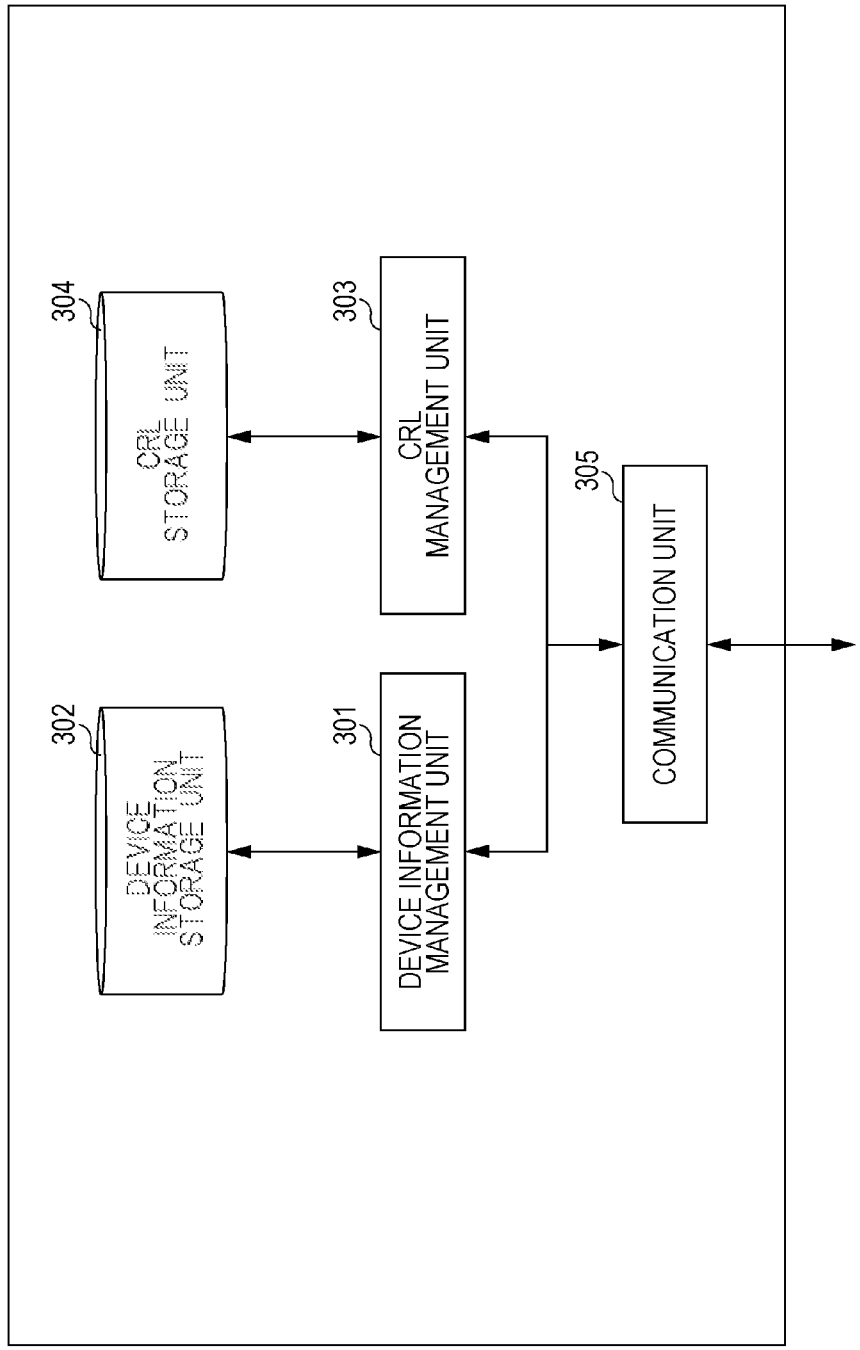
FIG. 8 is a configuration diagram of a manufacturer server according to the first embodiment.

FIG. 8 is a configuration diagram of the manufacturer server 300a. The manufacturer server 300a is configured including a device information management unit 301, a device information storage unit 302, a CRL management unit 303, a CRL storage unit 304, and a communication unit 305. The service server 300b is configured in the same way.

The device information management unit 301 controls the device information storage unit 302, and manages association between controllers and devices, IDs of controllers and devices being connected and certificate IDs of public key certificates, and device history. Also, upon having detecting an unauthorized device or controller, the device information management unit 301 notifies the portal server of the certificate ID of the public key certificate of that device or controller, and places a CRL issue request. In a case of having updated the CRL, the device information management unit 301 transmits the CRL to the CRL management unit 303.

The device information storage unit 302 records the IDs and certificate IDs of the controller and devices, and device history. FIG. 9 is a diagram illustrating an example of a device information management table that the device information storage unit 302 holds. This shows that device ID1 through device ID3 are connected to the controller with the controller ID1, which is the ID of the controller. This also shows that the certificate ID of the controller and the certificate IDs of the devices also are recorded. This shows that the history information of the device ID1 is recorded in the history information 1.

The CRL management unit 303 controls the CRL storage unit 304, and upon having received a CRL from the device information management unit 301, updates the CRL of the CRL storage unit 304.

The CRL storage unit 304 records CRLs.

The communication unit 305 communicates with the controller 100a and the portal server 400. Communication with the controller 100a and portal server 400 is performed via SSL communication. Certificates necessary for SSL communication are recorded in the communication unit 305.

The configuration of the content server 300c differs from that of the manufacturer server 300a. Connection is made with devices without going through the controller, so SSL authentication is performed between the content server 300c and the devices. The device information management table of the device information storage unit 302 is thus a device information management table with no controller information.

1.5 Configuration of Portal Server 400

Figure 10:
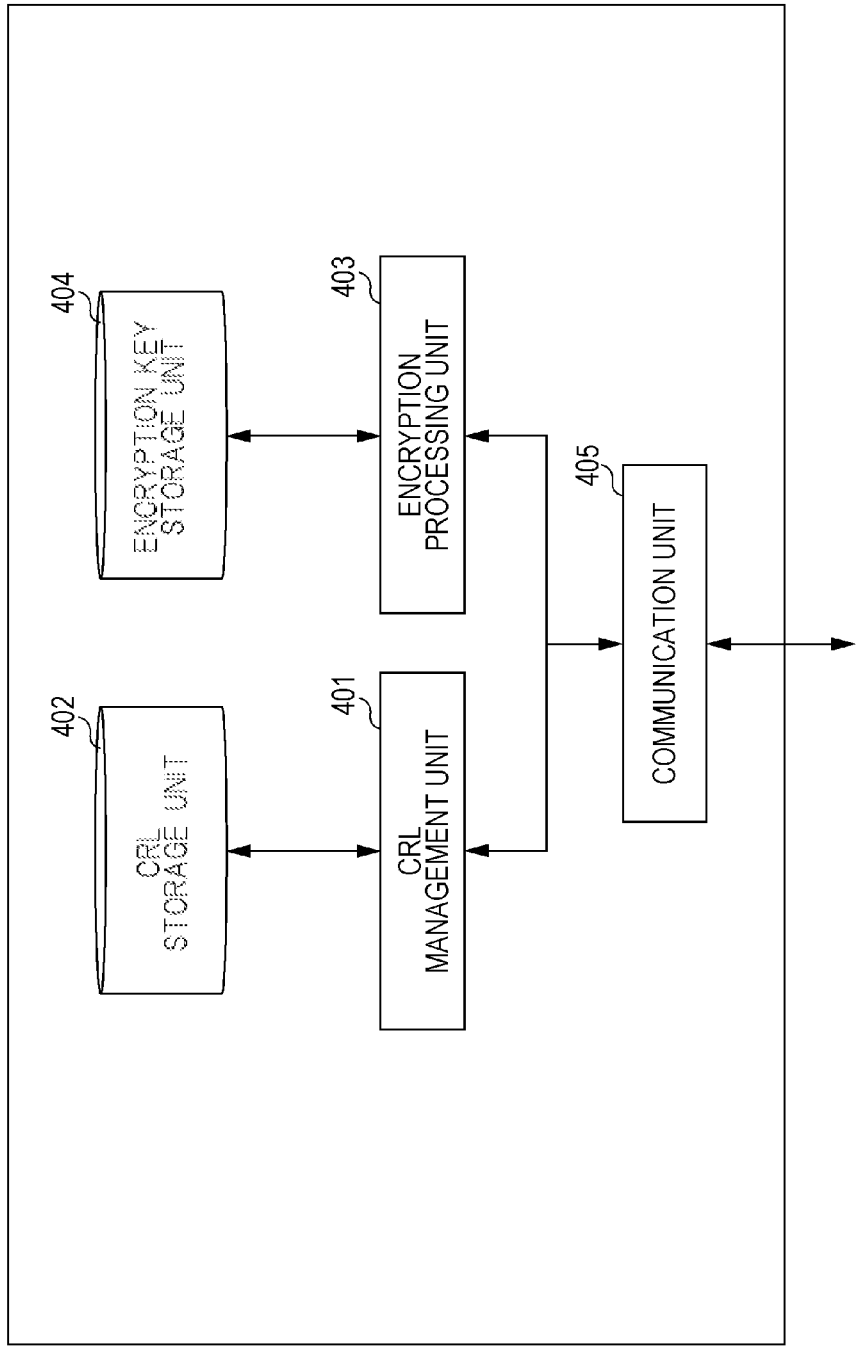
FIG. 10 is a configuration diagram of a portal server according to the first embodiment.

FIG. 10 is a configuration diagram of the portal server 400. The portal server 400 includes a CRL management unit 401, a CRL storage unit 402, an encryption processing unit 403, an encryption key storage unit 404, and a communication unit 405.

The CRL management unit 401 controls the CRL storage unit 402 to manage the CRLs. Upon receiving a CRL issue request from the manufacturer server 300a or service server 300b or the like, the CRL management unit 401 sets data other than signature in the CRL, and requests the encryption processing unit 403 to generate a CRL signature. The CRL management unit 401 receives the CRL with the generated signature from the encryption processing unit 403, and records in the CRL storage unit 402.

The CRL storage unit 402 records the issued CRL.

Upon receiving a request for signature generation from the CRL management unit 401, the encryption processing unit 403 uses a secret key held at the encryption key storage unit 404 to generate the CRL signature. Once the CRL signature is generated, the encryption processing unit 403 transmits the generated CRL signature to the CRL management unit 401.

The encryption key storage unit 404 holds the secret key for issuing a CRL for the portal server 400 which is the certificate authority.

The communication unit 405 performs communication with the servers 300a through 300c. The servers 300a through 300c perform SSL communication. Certificates necessary for SSL communication are recorded at the communication unit 405.

1.6 Operations of Authentication System 10

Operations of the authentication system 10 include the following.

(1) Device registration processing where connection is made from device to controller, and registration is made in server (2) Processing to update CRL of manufacturer server 300a (3) Processing to update CRL of device These will each be described below with reference to the drawings.

1.6.1 Operations at Time of Device Registration Processing

Figure 11:
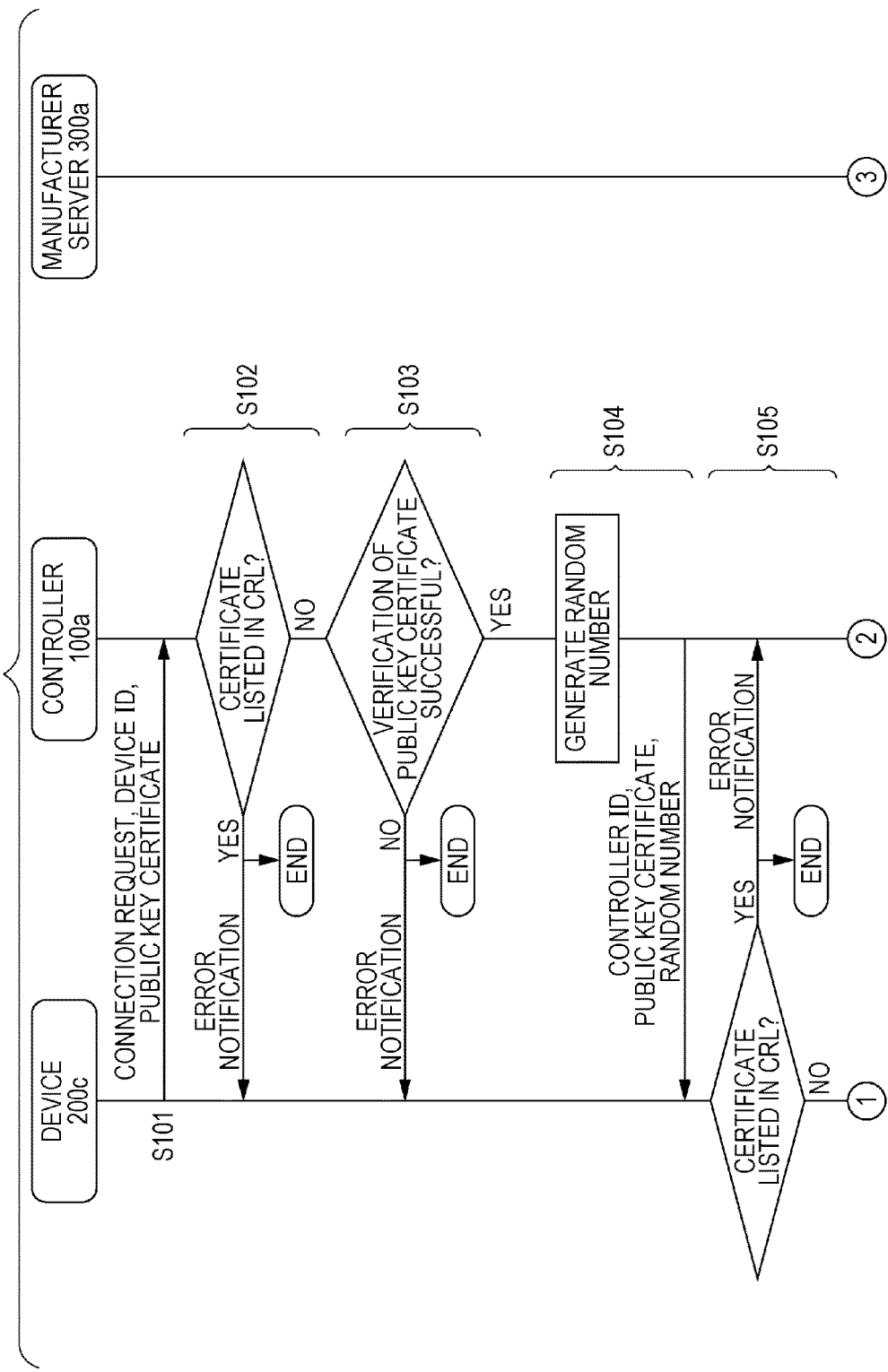
FIG. 11 is a sequence diagram for when registering a device, according to the first embodiment.
Figure 12:
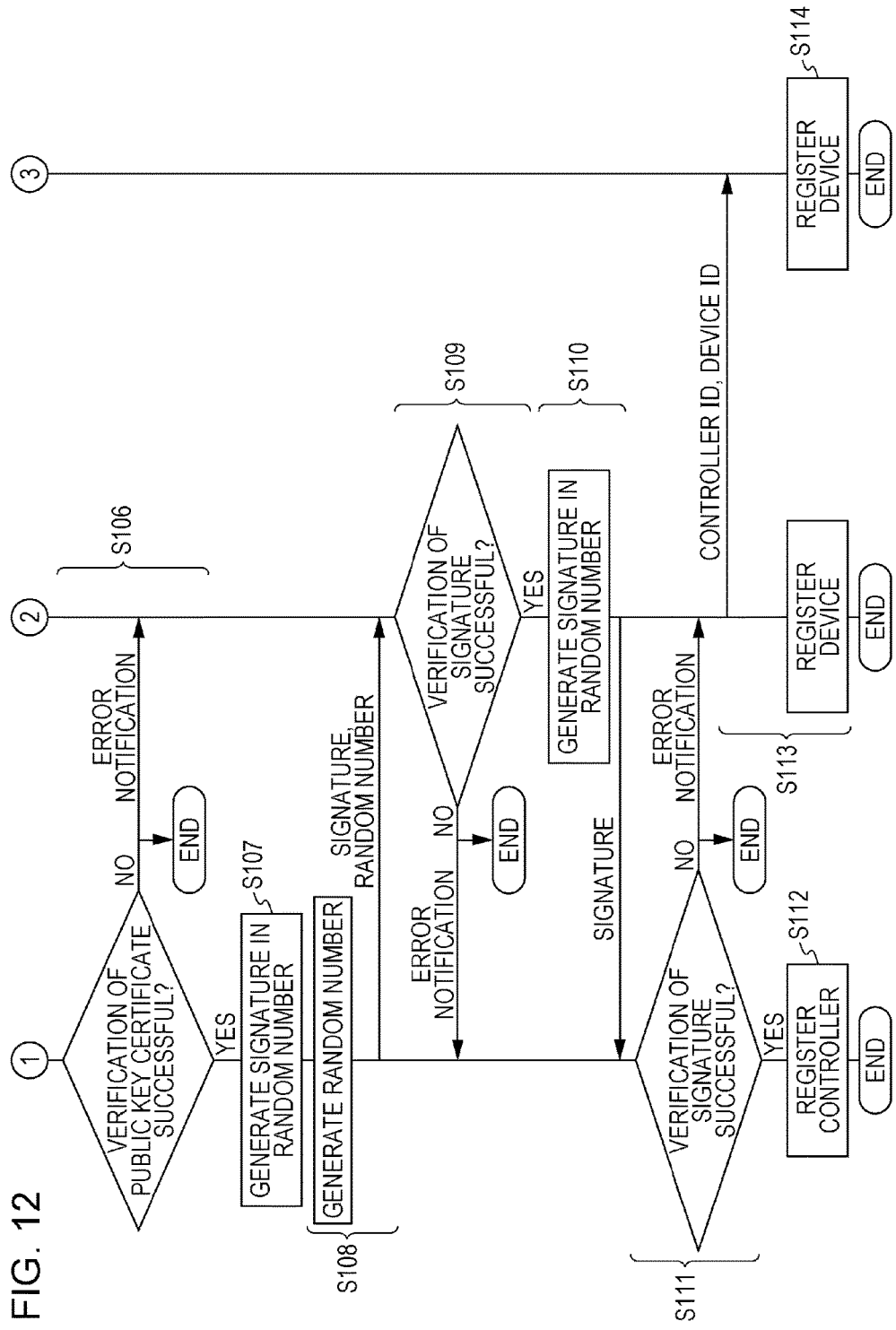
FIG. 12 is a sequence diagram for when registering a device, according to the first embodiment.

FIGS. 11 and 12 illustrate a sequence of processing where the device 200c connects to the controller 100a, and is registered to the manufacturer server 300a. Processing where the device 200a or 200b connect to the controller 100a and are registered to the manufacturer server 300a, and processing where the device 200c connects to the controller 100b and is registered to the service server 300b are the same.

In S101, a connection request is performed from the device 200c to the controller 100a. The device ID and public key certificate of the device are also transmitted at this time.

In S102, verification is performed regarding whether or not the certificate ID of the public key certificate of the device 200c, regarding which the controller 100a has received the connection request, is listed in the CRL held in the authentication information storage unit. If listed in the CRL, an error is notified to the device 200c and the processing ends.

In S103, the controller 100a verifies the signature of the public key certificate received from the device 200c. In a case where the verification is not successful, the device 200c is notified of an error and the processing ends. The signature at this time may be an elliptic curve digital signature algorithm (ECDSA). ECDSA is described in National Security Agency, "Suite B Implementer's Guide to FIPS 186-3 (ECDSA)", [online], Feb. 3, 2010, [Searched Jun. 24, 2014], Internet <URL: http://www.nsa.gov/ia/_files/ecdsa.pdf>, and accordingly will not be described here.

In S104, the controller 100a generates a random number, and transmits to the device 200c along with the controller ID and public key certificate.

In S105, the device 200c verifies whether the certificate ID of the public key certificate of the controller 100a which has transmitted the connection request is listed in the CRL that it holds. If listed in the CRL, an error is notified to the controller 100a and the processing ends.

In S106, the device 200c verifies the signature of the public key certificate received from the controller 100a. In a case where verification fails, an error is notified to the controller 100a and the processing ends.

In S107, the device 200c generates a signature from the random number received from the controller 100a and the secret key of the device 200c.

In S108, the device 200c generates a random number, and transmits to the controller 100a along with the signature generated in S107.

In S109, the controller 100a receives the signature and random number, and verifies the signature using the public key certificate received in S101. In a case where verification of the signature fails, an error is notified to the device 200c and the processing ends.

In S110, the controller 100a generates a signature from the random number received in S109 and the secret key of the controller 100a, and transmits the signature to the device 200c.

In S111, the device 200c receives the signature, and verifies the signature using the public key certificate received in S104. In a case where verification of the signature fails, an error is notified to the controller 100a and the processing ends.

In S112, in a case where verification in S111 is successful, the device 200c registers the controller in the connecting controller management table.

In S113, the controller 100a transmits the controller ID and certificate ID of the public key certificate, and the device ID of the device regarding which verification was successful in S109 and the certificate ID of the public key certificate, to the manufacturer server, and registers the device ID of the device and the certificate ID of the public key certificate in the connecting device management table.

In S114, upon receiving, from the controller 100a, the controller ID and certificate ID of the public key certificate of the controller 100a and the device ID and certificate ID of the public key certificate of the device 200c, the manufacturer server 300a registers in the device information management table.

Figure 13:
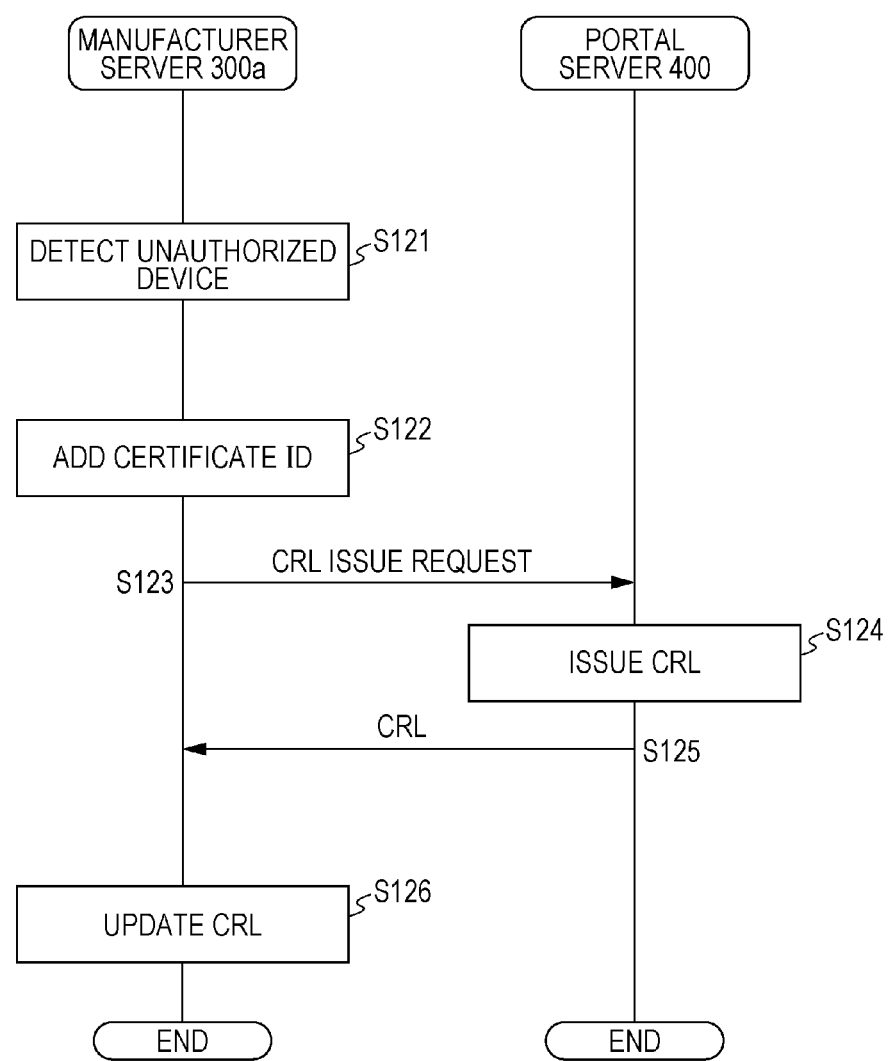
FIG. 13 is a sequence diagram for when updating a CRL of a manufacturer server, according to the first embodiment.

1.6.2 Operations at Time of Processing to Update CRL of Manufacturer Server 300a FIG. 13 illustrates a sequence of updating the CRL of the manufacturer server 300a.

In S121, the manufacturer server 300a detects an unauthorized device. Specific examples are a case of detecting multiple controllers connecting to the manufacturer server 300a with the same certificate ID, a case of detecting multiple devices of the same certificate ID registered to the manufacturer server 300a, and so forth. Also, in a case where leakage of a secret key has been detected, a device or controller having a public key certificate corresponding thereto is also determined to be an unauthorized device.

In S122, the manufacturer server 300a adds the certificate ID of the unauthorized device or the unauthorized controller detected in S121, to the certificate IDs listed in the CRL.

In S123, the manufacturer server 300a transmits a CRL issue request along with the certificate IDs of the public key certificates of all unauthorized devices and unauthorized controllers, to the portal server 400 which is the certificate authority.

In S124, the portal server 400 issues a CRL from the received certificate IDs.

In S125, the portal server 400 transmits the CRL to the manufacturer server 300a.

In S126, the manufacturer server 300a records the received CRL in the CRL storage unit, thereby updating to the newest CRL.

The above is an example of processing of updating the CRL of the manufacturer server 300a, but processing for updating CRLs held by the service server 300b and content server 300c is the same processing.

Also, even if detecting no unauthorized devices in S121, the manufacturer server 300a updates the CRL before the next issue date.

1.6.3 Operations at Time of Processing to Update CRL of Device

Figure 14:
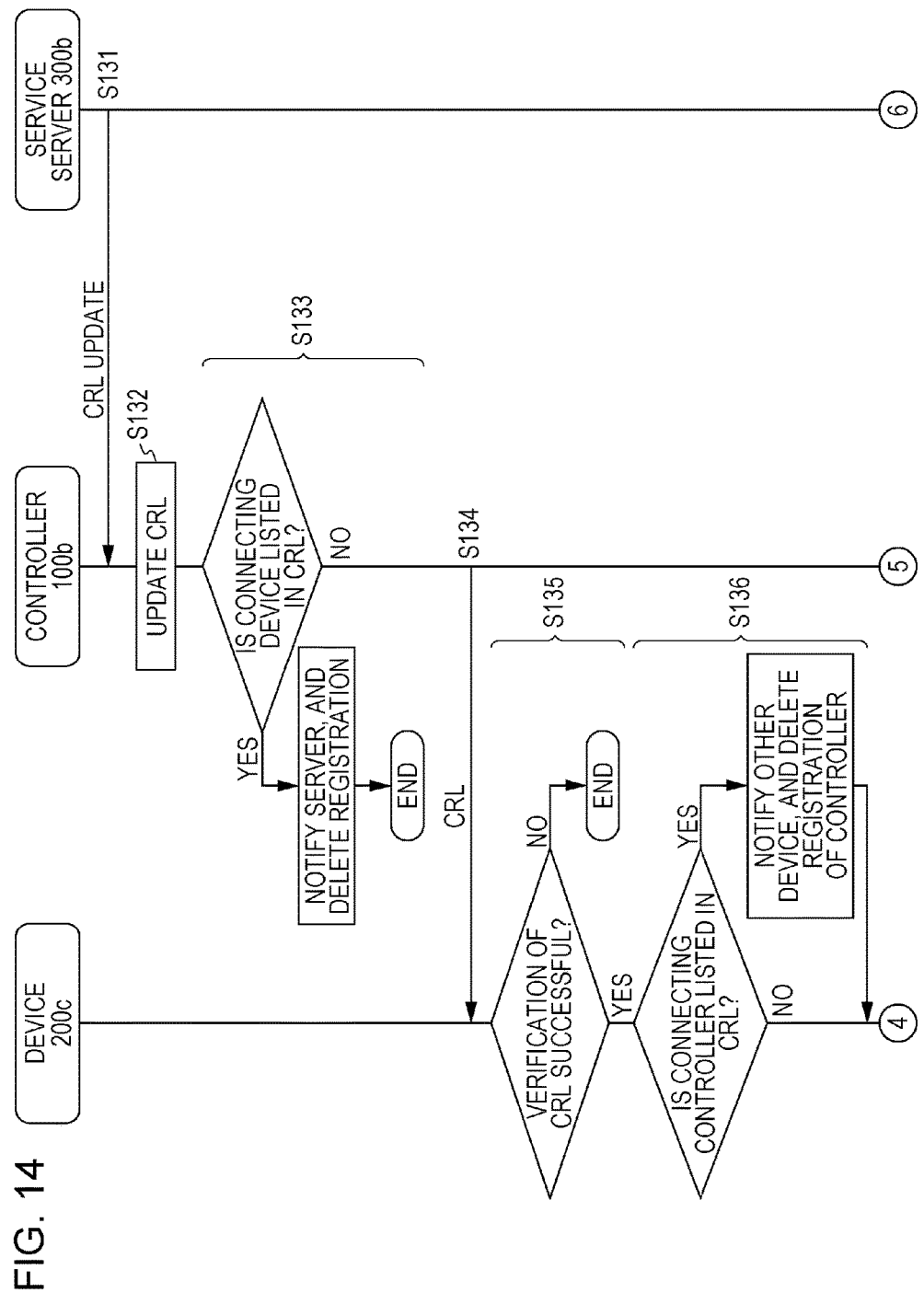
FIG. 14 is a sequence diagram for when updating a CRL of a device, according to the first embodiment.
Figure 15:
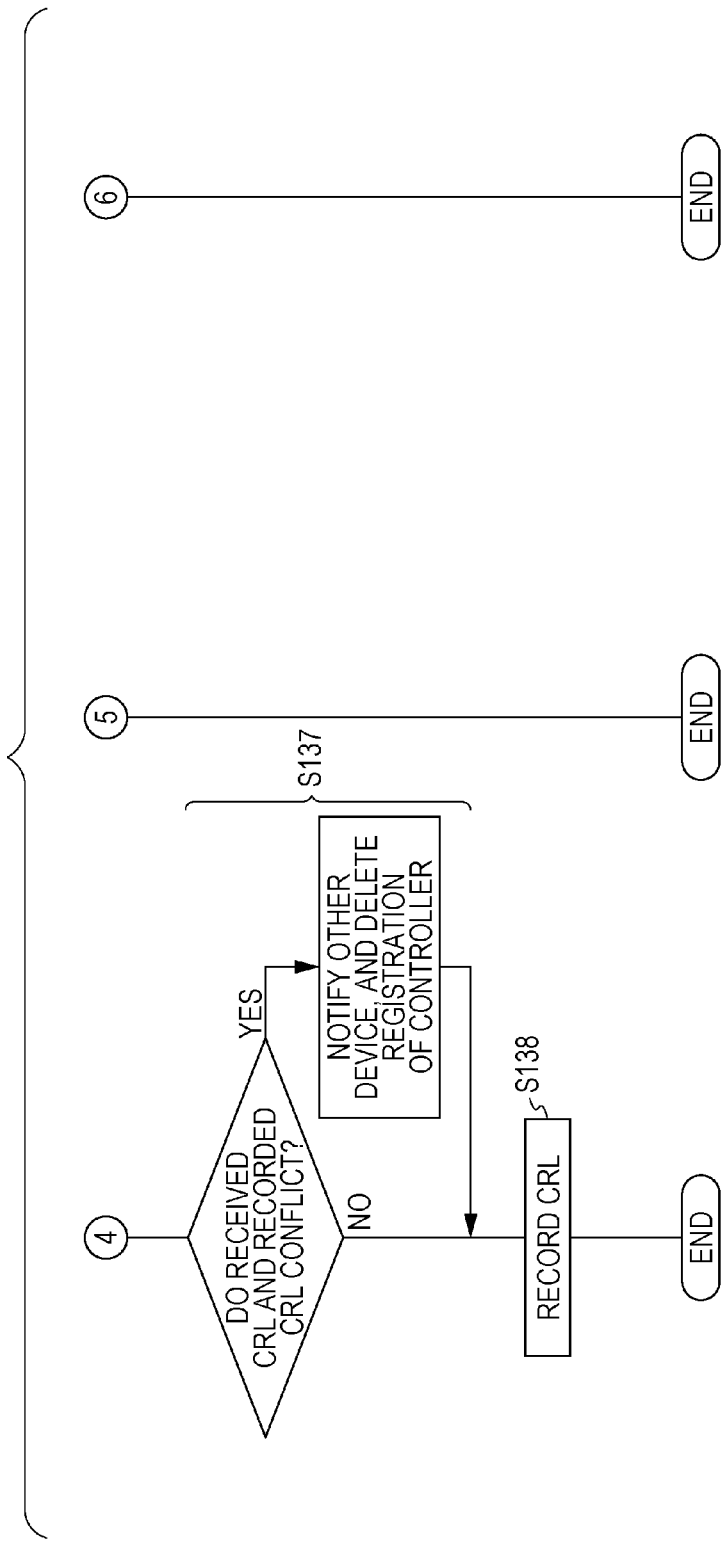
FIG. 15 is a sequence diagram for when updating a CRL of the device, according to the first embodiment.

FIGS. 14 and 15 illustrate a sequence to update the CRL of the device 200c from the controller 100b. Although an example of processing where the controller 100b updates the CRL of the device 200c will be described, the processing for updating the CRL of the device 200c from the controller 100a is the same.

In S131, after updating the CRL, the service server 300b requests the controller 100b for CRL updating processing along with the CRL.

In S132, the controller 100b updates to the CRL received from the service server 300b.

In S133, the controller 100b verifies whether a connecting device is listed in the CRL. If listed, this is notified to the service server 300b, and the registration of the listed device is deleted.

In S134, the controller 100b requests all connecting devices 200 for CRL updating processing along with the CRL. Description will be made here based on an example of requesting the device 200c to perform updating processing.

In S135, the device 200c verifies the signature of the received CRL. In a case where verification is not successful, the CRL updating processing ends.

In S136, the device 200c verifies whether or not any connecting controllers are listed in the CRL. If even one connecting controller is listed, the other devices and controllers are notified of detection of an unauthorized controller. Registration of this unauthorized controller is deleted from the connecting controller management table as well.

In S137, the device 200c compares the CRL received from the controller 100b and the CRL in the authentication information storage unit, and verifies whether or not there is inconsistency. Specifically, in a case where a CRL received from the controller 100a has been recorded, comparison is made between the issue date of the CRL received from the controller 100b and the next issue date of the CRL received from the controller 100a. In a case where the next issue date of the CRL received from the controller 100a is before the issue date of the CRL received from the controller 100b, determination is made that the next issue date of the CRL received from the controller 100a has passed, so the controller 100a is detected as an unauthorized controller since it did not update the CRL. Also, the versions of the CRLs received from the controller 100a and the controller 100b are compared, and if the CRL version does not match, the controller which transmitted the older version CRL is detected as an unauthorized controller since it did not update the CRL. At this time, the device 200c notifies the other devices and controllers of detection of an unauthorized controller. Registration of this unauthorized controller is deleted from the connecting controller management table as well. Connection with the controller 100a is also cut off.

Note that although the above describes using the issue date and the version of CRLs to determine CRL contradictions, the configuration is not limited thereto, and any information enabling the relative age of a CRL to be identified may be used.

In S138, the device 200c records the received CRL in the authentication information storage unit.

Figure 16:
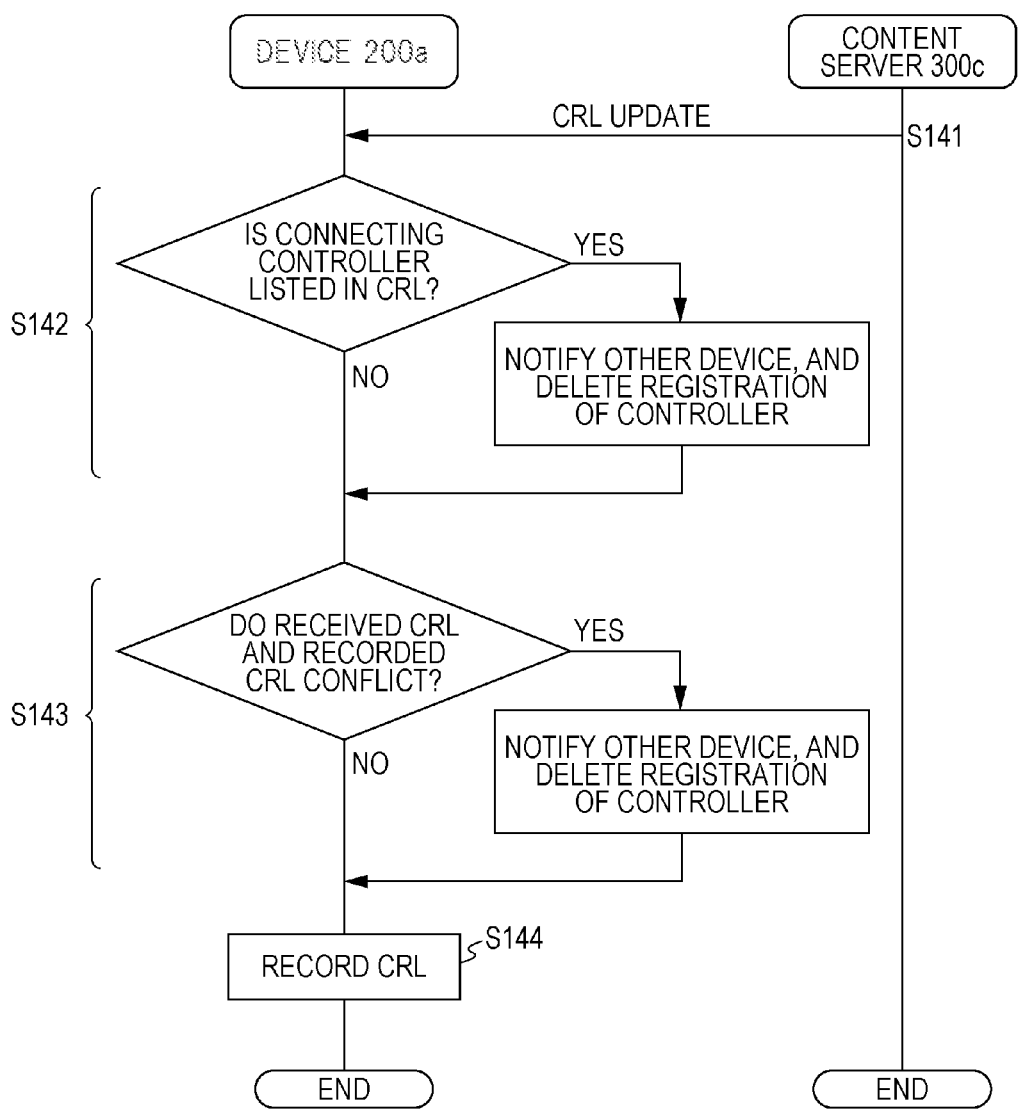
FIG. 16 is a sequence diagram for when updating a CRL of the device, according to the first embodiment.

FIG. 16 illustrates a sequence of the content server 300c updating the CRL of the device 200c.

In S141, after updating the CRL, the content server 300c requests the device 200c for CRL updating processing along with the CRL.

In S142, the device 200c verifies whether or not any connecting controllers are listed in the CRL. If even one connecting controller is listed, the other devices, controllers, and content server 300c are notified of detection of an unauthorized controller. Registration of this unauthorized controller is deleted from the connecting controller management table as well.

S143 is the same as the processing S137 and thus description thereof will be omitted.

S144 is the same as the processing S138 and thus description thereof will be omitted.

1.7 Advantages of First Embodiment

A device which connects to one controller cannot update the CRL if this controller is an unauthorized controller. In the first embodiment, the device receives CRLs from multiple controllers. Thus, the CRL can be acquired via multiple networks, and updating can be performed. Enabling updating of the CRL enables connection to unauthorized controllers to be prevented, and safe connection to be realized among authorized controllers and devices.

Second Embodiment

2. System Configuration

An authentication system 11 according to the present disclosure will be described here as an embodiment of the present disclosure, with reference to the drawings.

In the authentication system 11 according to a second embodiment, an encryption key of communication is shared between the controller and device after authentication, and history information of the device is transmitted to the server by encrypted communication.

2.1 Overall Configuration of Authentication System 11

The overall configuration of the authentication system 11 according to the second embodiment is the same as in the first embodiment, and accordingly description will be omitted here. Components having the same configuration as those in the first embodiment are denoted by the same reference numerals, and description will be omitted.

2.2 Operations of Authentication System 11

Operations of the authentication system 11 include the following.

(1) Device registration processing where connection is made from device to controller, and registration is made in server (2) Processing to update CRL of manufacturer server 300a (3) Processing to update CRL of device (4) Processing to transmit device history information from device to server The processing of (2) and (3) is the same as in the first embodiment, so description will be omitted here.

Each will be described below with reference to the drawings.

2.2.1 Operations at Time of Device Registration Processing

Figure 17:
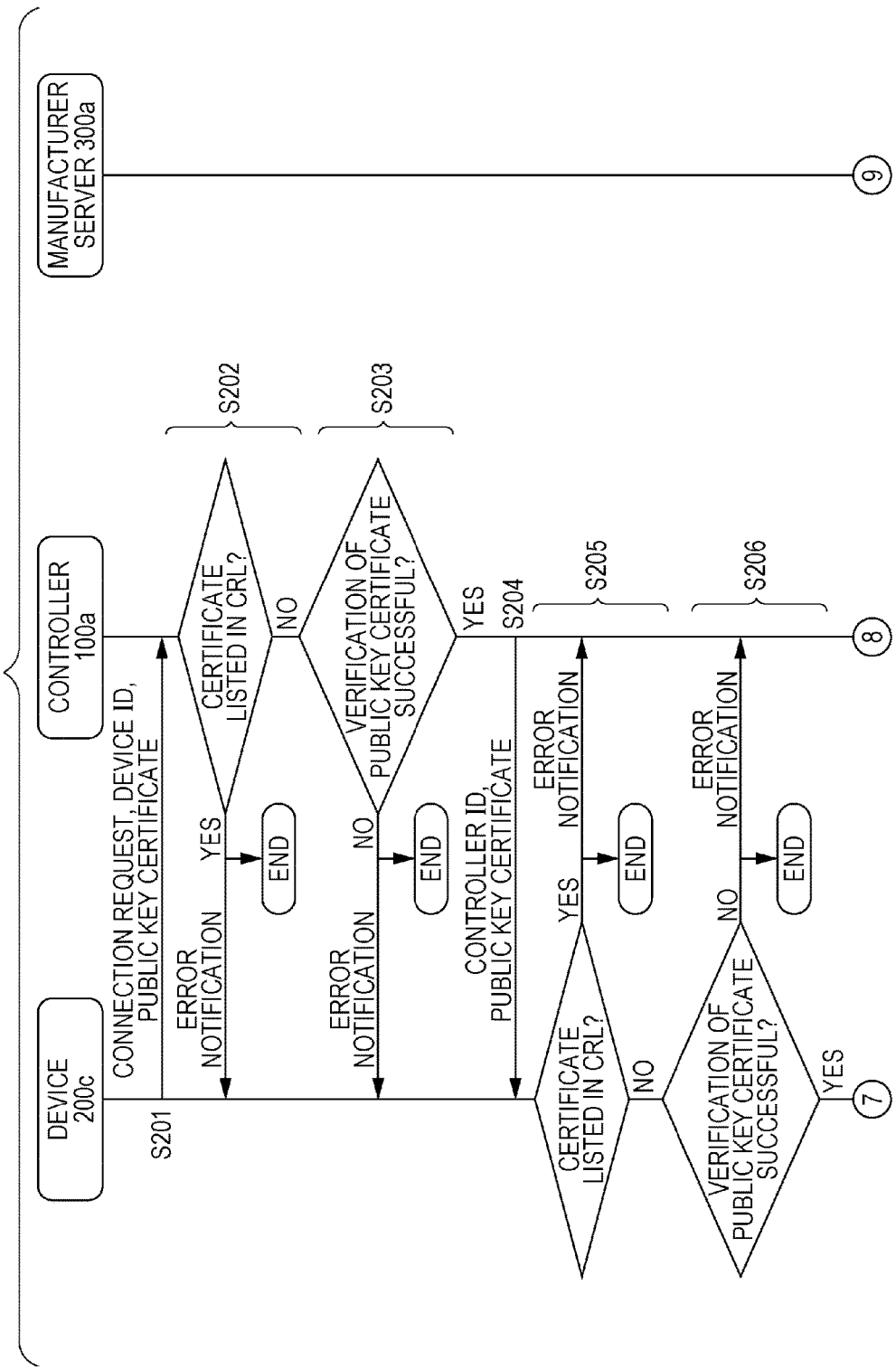
FIG. 17 is a sequence diagram for when registering a device, according to a second embodiment.
Figure 18:
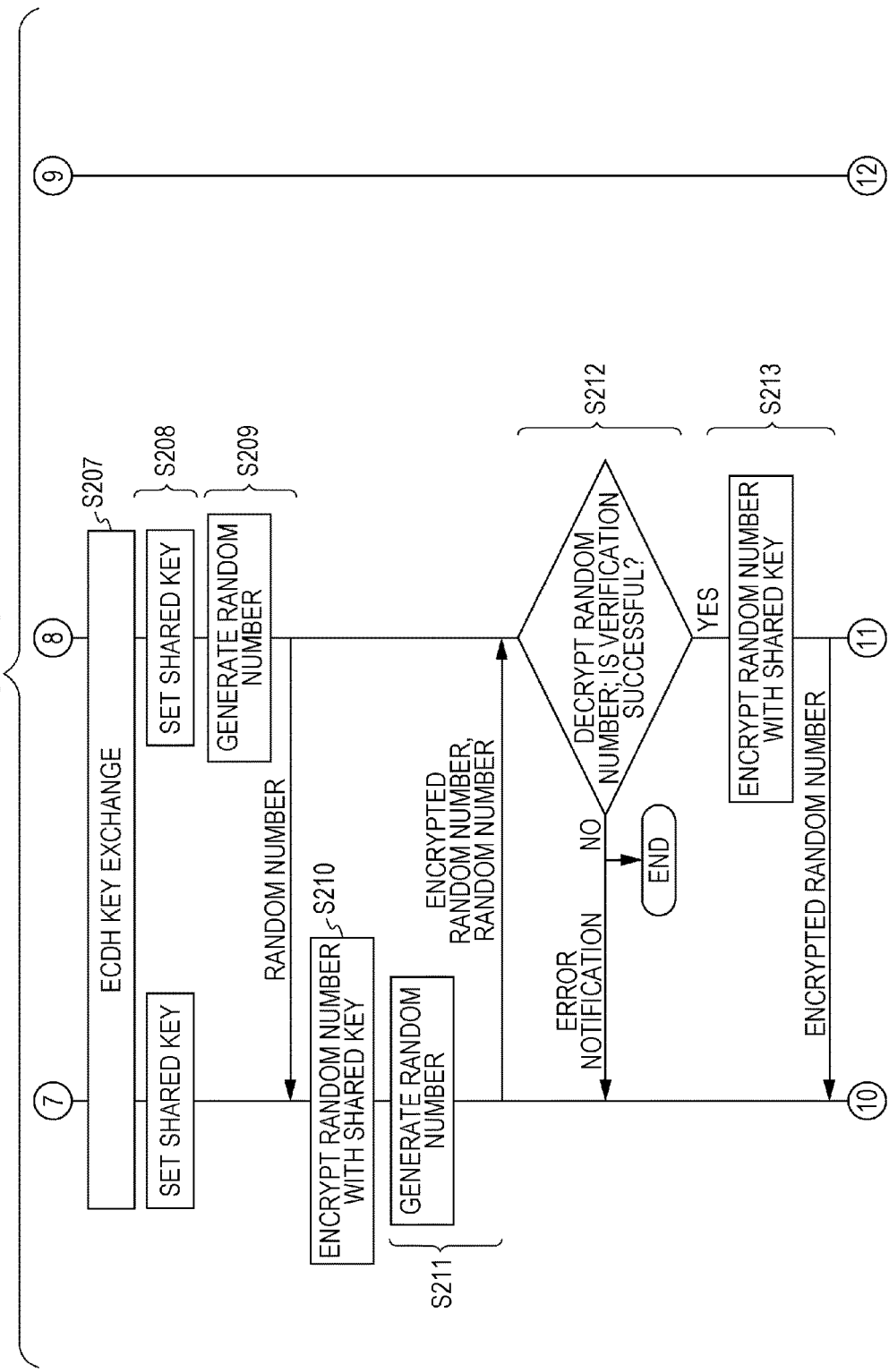
FIG. 18 is a sequence diagram for when registering the device, according to the second embodiment.
Figure 19:
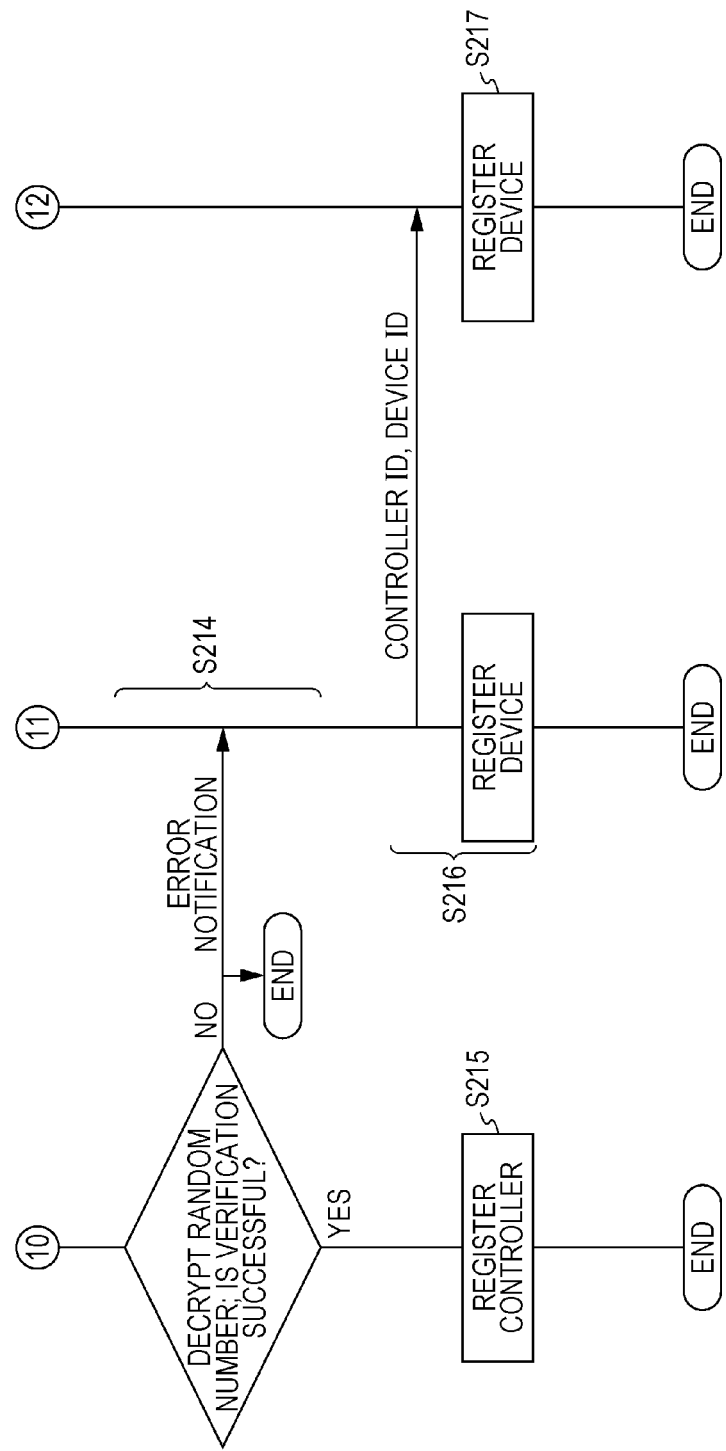
FIG. 19 is a sequence diagram for when registering the device, according to the second embodiment.

FIGS. 17 through 19 illustrate a sequence of processing where the device 200c connects to the controller 100a, and is registered to the manufacturer server. Processing where the device 200a or 200b connect to the controller 100a and are registered to the manufacturer server, and processing where the device 200c connects to the controller 100b, and is registered to the service server, are the same.

The processing in S201 through S203 is the same as the processing in S101 through S103 in the first embodiment, so description will be omitted here.

In S204, the controller 100a transmits the controller ID and public key certificate to the device 200c.

The processing in S205 through S206 is the same as the processing in S105 through S106, so description will be omitted here.

In S207, the device 200c and controller 100a exchange keys. Elliptic curve Diffie-Hellman (ECDH), which is an elliptic curve cryptography key exchange method, is used here. ECDH is described in "Elaine Barker, three others, NIST Special Publication 800-56A Revision 2, 'Recommendation for Pair-Wise Key-Establishment Schemes Using Discrete Logarithm Cryptography', [online], May 13, 2013, National Institute of Standards and Technology, [Searched Jun. 24, 2014], Internet <URL: http://nvlpubs.nist.gov/nistpubs/SpecialPublications/NIST.SP.800-56Ar2.pdf>", and accordingly will not be described here.

In S208, the device 200c and controller 100a set the key shared in the key exchange as a shared key.

In S209, the controller 100a generates a random number, and transmits to the device 200c.

In S210, the device 200c receives the random number from the controller 100a, and encrypts using the shared key.

In S211, the device 200c generates a random number, and transmits to the controller 100a along with the encrypted random number generated in S210.

In S212, the controller 100a receives the encrypted random number and the random number, decrypts the encrypted random number using the shared key, and verifies whether it matches the random number generated in S210. In a case where verification fails, an error is notified to the device 200c and the processing ends.

In S213, in a case where verification is successful in S212, the controller 100a uses the shared key to encrypt the random number received in S212, and transmits the encrypted random number to the device 200c.

In S214, the device 200c receives the encrypted random number, decrypts the encrypted random number using the shared key, and verifies whether it matches the random number generated in S211. In a case where verification fails, an error is notified to the controller 100a and the processing ends.

In S215, in a case where verification is successful in S214, the device 200c registers the controller 100a in the connecting controller management table. FIG. 20 is a connecting controller management table according to the second embodiment, configured including the shared key shared with the controller, in addition to the connecting controller management table according to the first embodiment.

In S216, the controller 100a transmits the controller ID and certificate ID of the public key certificate, and the device ID of the device regarding which verification was successful in S212 and the certificate ID of the public key certificate, to the manufacturer server 300a, and registers the device ID of the device and the certificate ID of the public key certificate in the connecting device management table. FIG. 21 is a connecting device management table according to the second embodiment, configured including the shared key shared with the device, in addition to the connecting device management table according to the first embodiment.

The processing in S217 is the same as the processing in S114 in the first embodiment, so description will be omitted here.

Figure 22:
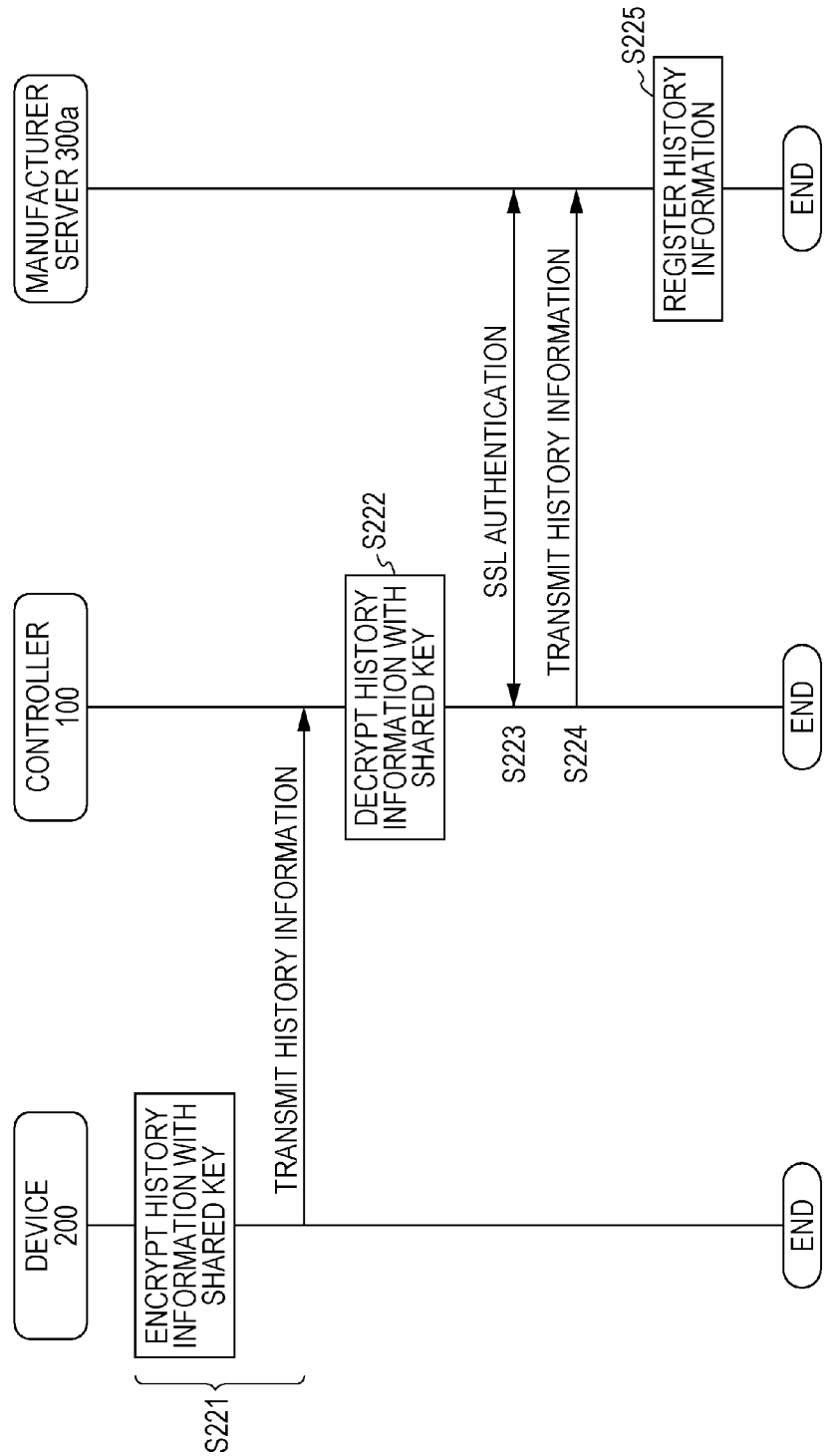
FIG. 22 is a sequence diagram for when performing transmission processing of device history information according to the second embodiment.

2.2.2 Operations Processing for Transmitting Device History Information from Device to Manufacturer Server 300a FIG. 22 illustrates a sequence of transmitting device history information from the device to the manufacturer server 300a. This uploading is performed periodically or non-periodically.

In S221, the device encrypts accumulated device history information using the shared key, and transmits to the controller along with the device ID.

In S222, the controller receives the device ID and encrypted device history information, searches for the shared key based on the device ID, and decrypts the device history information using the shared key.

In S223, the controller and manufacturer server 300a perform SSL authentication, and establish an encrypted communication path.

In S224, the controller transmits the controller ID and device ID received from the device and the device history information to the manufacturer server 300a.

In S225, the manufacturer server 300a registers the received controller ID, device ID, and device history information.

2.3 Advantages of Second Embodiment

Key exchange is performed when authenticating the device, and the shared key is used for challenge-response authentication in the second embodiment. The shared key can be generated from just the public key corresponding to the secret key, so if a device does not have the secret key corresponding to the public key of the public key certificate, the shared key cannot be generated, and challenge-response authentication will fail. Accordingly, authentication processing can be reduced as compared to authentication processing where signature generation using the secret key and signature verification using the public key are performed. Encrypted communication of the device history information can be performed by the shared key, so leakage of device history information can be prevented.

Third Embodiment

In a third embodiment, when a device uploads operating history information to a server via a controller, the operating history information is uploaded together with added CRL information. On the server side, the controller is judged to be unauthorized or not from the CRL information transmitted from the device. Hereinafter, a detailed description will be given using the drawings.

Figure 23:
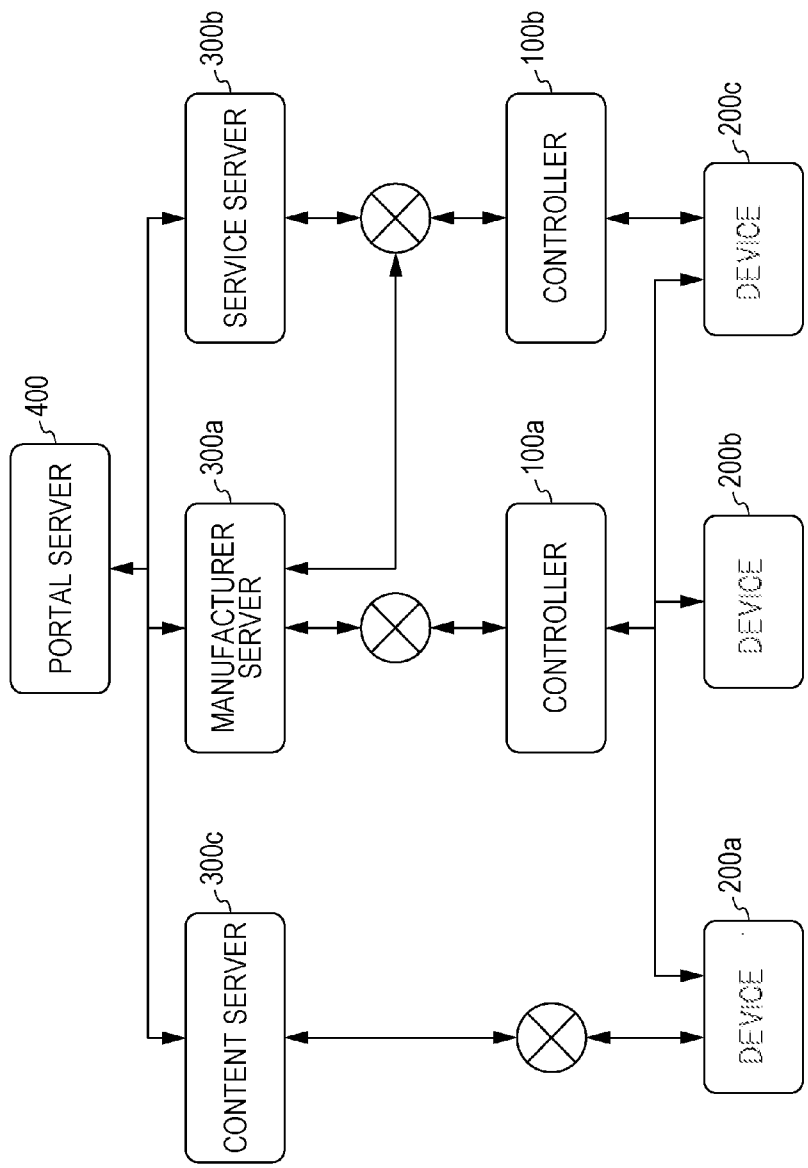
FIG. 23 is an overall configuration diagram of an authentication system 10 according to a third embodiment.

FIG. 23 is a diagram illustrating an overall configuration of an authentication system 10 according to the third embodiment. The authentication system 10 is made up of a controller 100, a device 200, a server 300, and a portal server 400. Structural elements similar to the first embodiment are denoted with the same signs, and the description thereof will be reduced or omitted. The third embodiment differs from the first embodiment in that the manufacturer server 300a is connected to the controller 100a and the controller 100b via a network.

Figure 24:
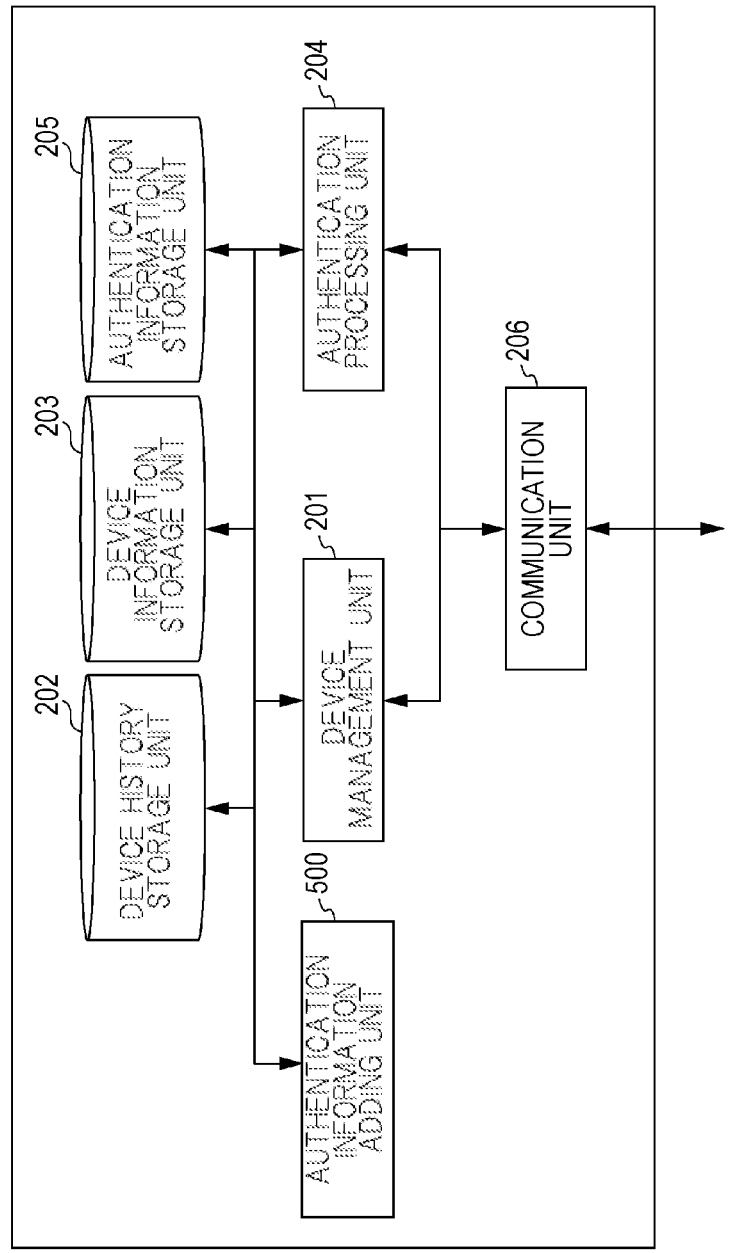
FIG. 24 is a configuration diagram of device according to the third embodiment.

FIG. 24 is a configuration diagram of a device 200a according to the third embodiment. The device 200a includes a device management unit 201, a device history storage unit 202, a device information storage unit 203, an authentication processing unit 204, an authentication information storage unit 205, a communication unit 206, and an authentication information adding unit 500.

Since the device management unit 201, the device history storage unit 202, the device information storage unit 203, the authentication processing unit 204, the authentication information storage unit 205, and the communication unit 206 are similar to those described using FIG. 6 in the first embodiment, the description thereof is omitted herein.

When device history information 600 stored in the device history storage unit 202 is uploaded to the manufacturer server 300a, the authentication information adding unit 500 adds the CRL information stored in the authentication information storage unit 205 to the device history information to generate device history information with added CRL information 700. The device history information with added CRL information 700 will be discussed later using FIG. 26.

Figures 25, 26:
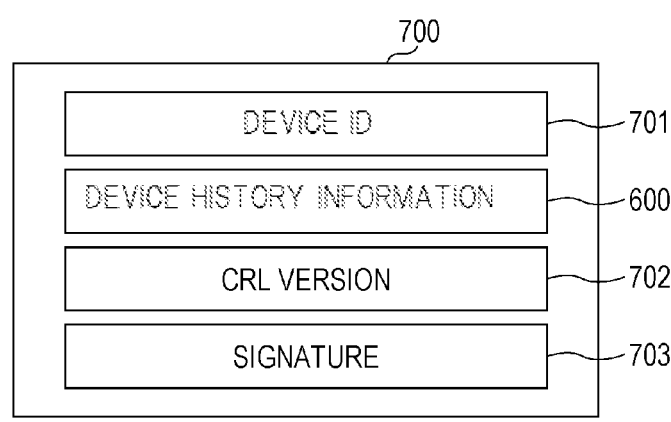
FIG. 25 is a configuration diagram of device history information according to the third embodiment.
FIG. 26 is a configuration diagram of device history information with added CRL information according to the third embodiment.

FIG. 25 is a diagram illustrating the device history information 600 stored in the device history storage unit 202 according to the third embodiment.

The device history information 600 is information that indicates who performed what operations on a device and when, and includes a time of operation 601, operation history details 602, and the user ID 603 of the person who performed the operation.

FIG. 26 is a diagram illustrating device history information with added CRL information 700 according to the third embodiment.

In the device history information with added CRL information 700, a signature 703, which is the private key of a device, is assigned to an device ID 701, device history information 600, and a CRL version 702. Since the signature generation method is similar to the first embodiment, the description thereof is omitted. The device history information with added CRL information 700 is uploaded by the communication unit 206 and ultimately to the server via the controller. A sequence of uploading the device history information with added CRL information 700 to the server will be discussed later using FIGS. 29 to 31.

Figure 27:
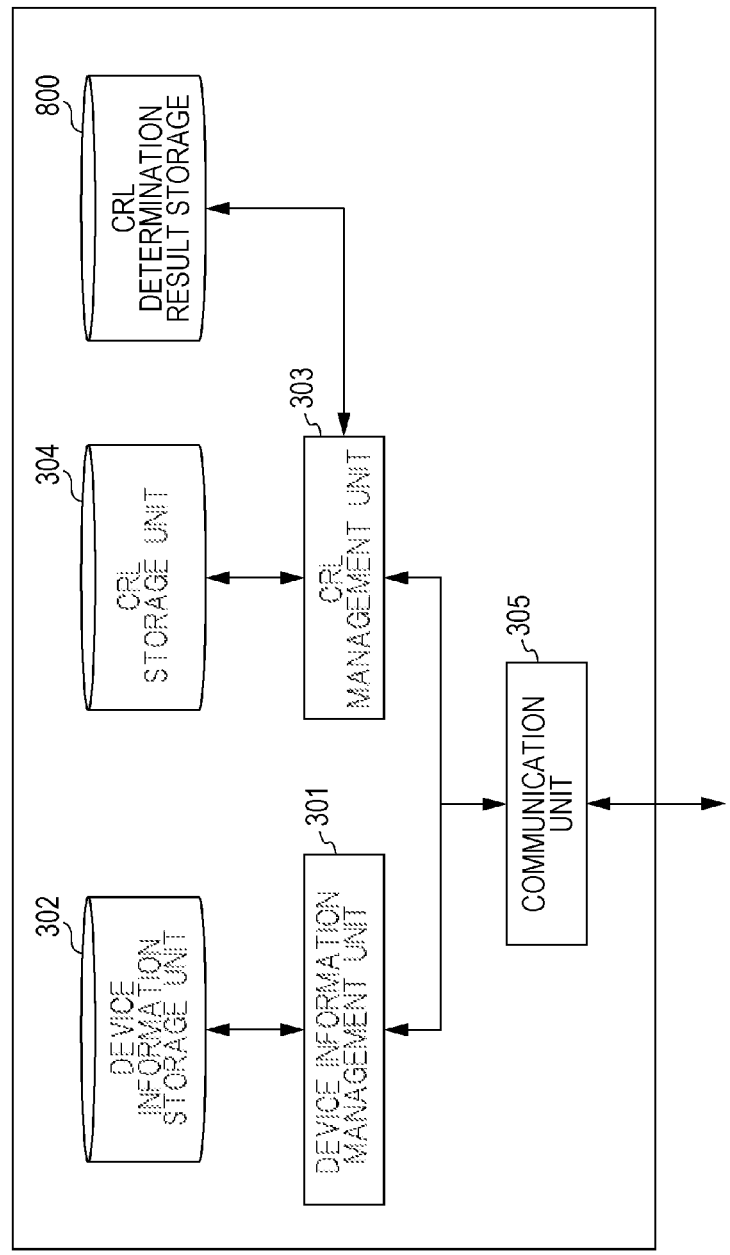
FIG. 27 is a configuration diagram of a manufacturer server according to the third embodiment.

FIG. 27 is a configuration diagram of the manufacturer server 300a according to the third embodiment. The manufacturer server 300a includes a device information management unit 301, a device information storage unit 302, a CRL management unit 303, a CRL storage unit 304, a communication unit 305, and a CRL determination result storage 800. The service server 300b likewise has a similar configuration. Since the device information management unit 301, the device information storage unit 302, the CRL management unit 303, the CRL storage unit 304, and the communication unit 305 are similar to FIG. 8 of the first embodiment, the description thereof is omitted.

The CRL determination result storage 800 stores a result of the manufacturer server 300a judging whether or not a controller is correctly distributing the CRL to each device. Details will be described using FIG. 28.

FIG. 28 is a diagram illustrating CRL determination result information 801 stored in the CRL determination result storage 800 according to the third embodiment.

The CRL determination result information 801 includes a controller ID 802 and an unauthorized controller determination result 803.

The unauthorized controller determination result 803 is the result of the manufacturer server 300a judging whether or not a controller is unauthorized by using the device history information with added CRL information 700.

An unauthorized controller determination result 803 of "authorized" indicates that the controller is distributing an up-to-date CRL to device. On the other hand, an unauthorized controller determination result 803 of "unauthorized" indicates that the controller is not distributing an up-to-date CRL to device.

Figure 29:
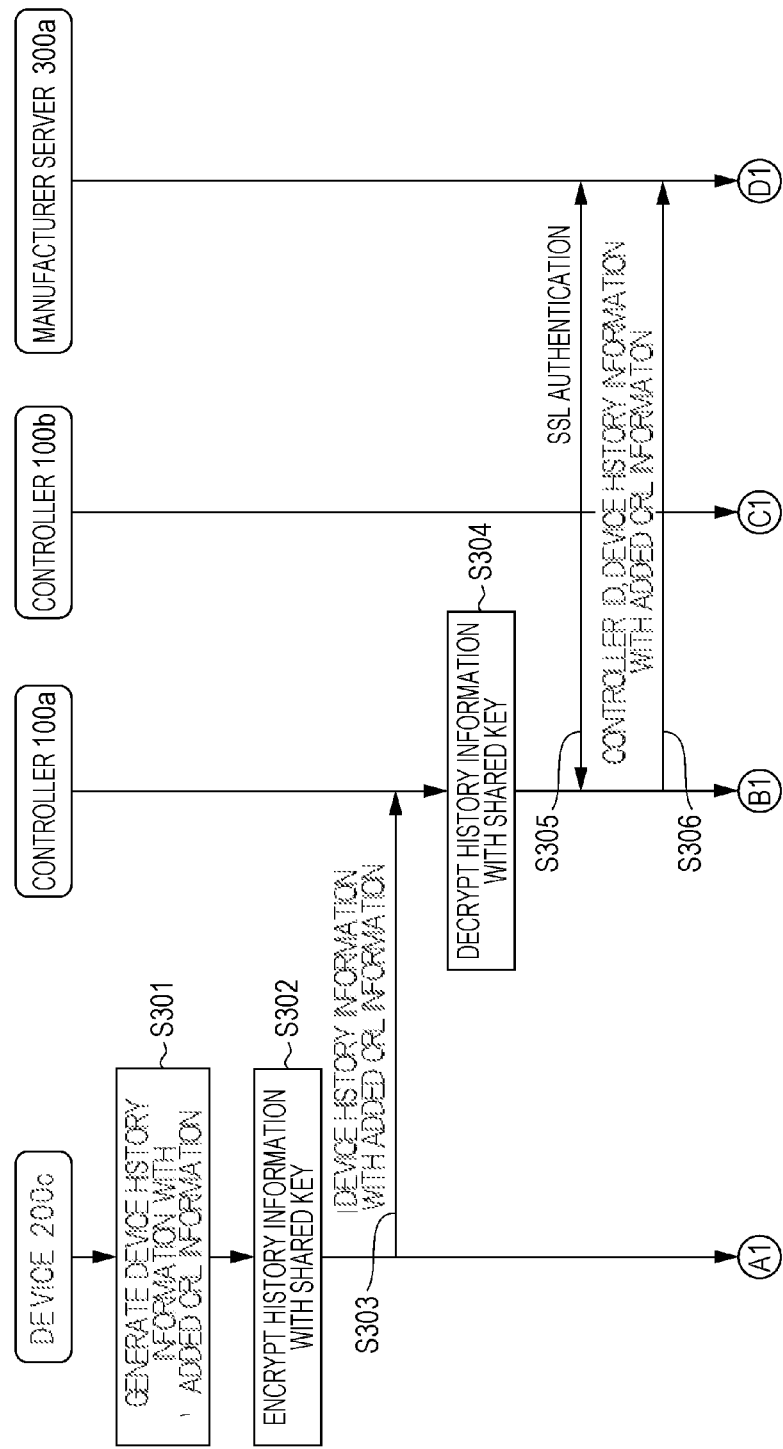
FIG. 29 is a CRL update sequence diagram when uploading device history information with added CRL information according to the third embodiment.
Figure 30:
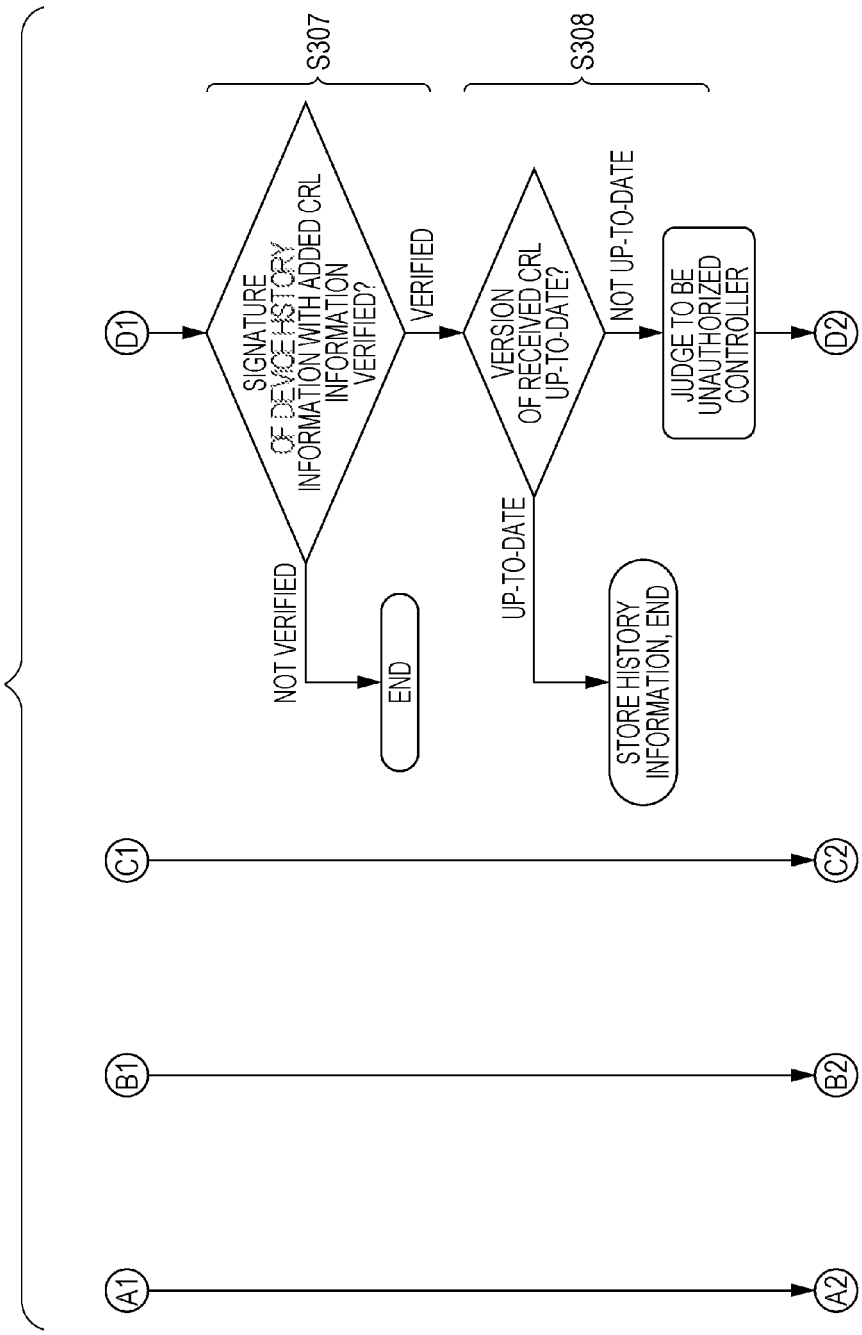
FIG. 30 is a CRL update sequence diagram when uploading device history information with added CRL information according to the third embodiment.
Figure 31:
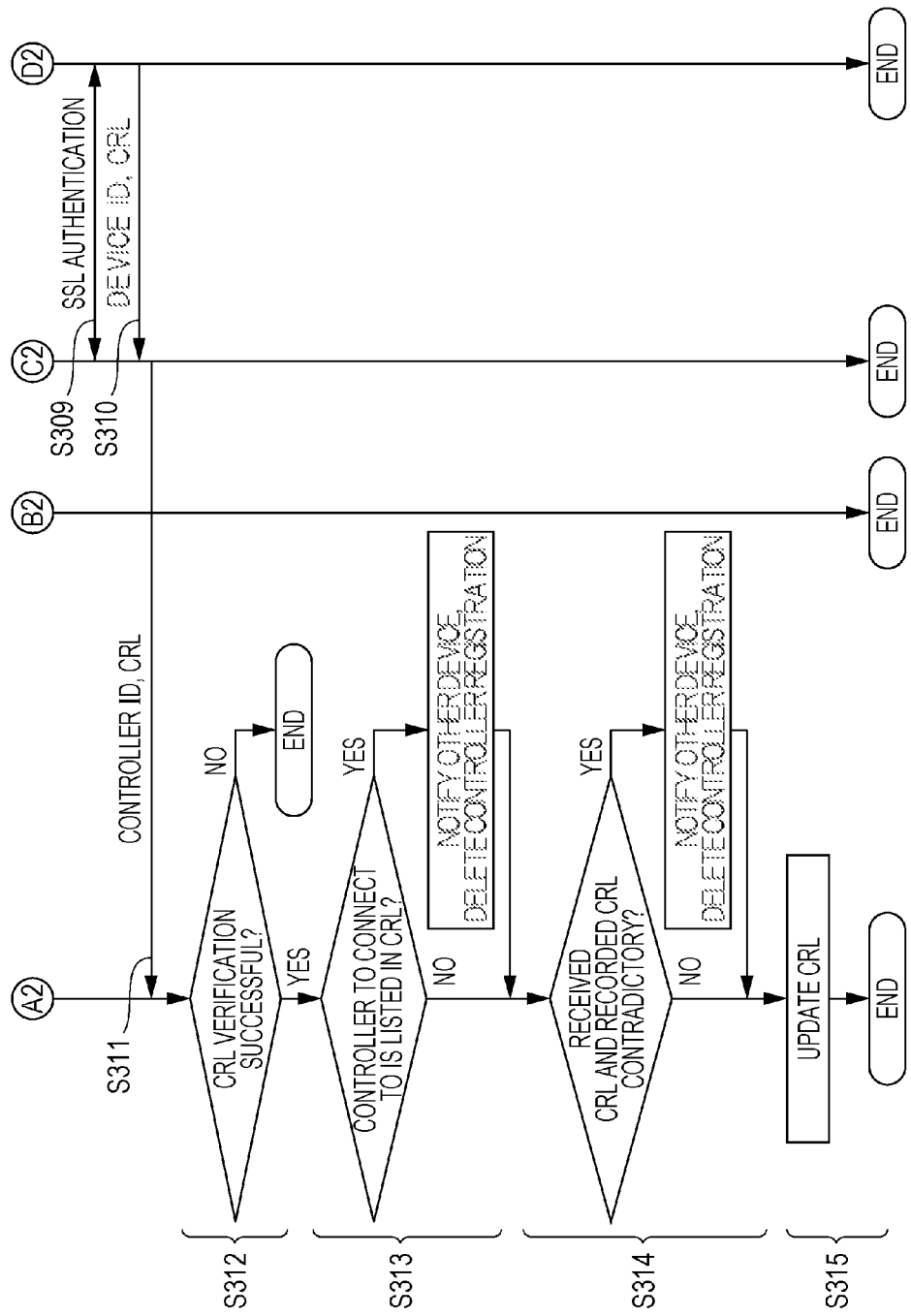
FIG. 31 is a CRL update sequence diagram when uploading device history information with added CRL information according to the third embodiment.

FIGS. 29 to 31 illustrates a sequence of updating the CRL when the device 200c connects to the controller 100a and uploads device history information with added CRL information 700 to the manufacturer server 300a. The process of the device 200a or the device 200b connecting to the controller 100a and uploading device history information with added CRL information 700 to the manufacturer server 300a is also similar. Also, although the device history information with added CRL information 700 is uploaded to the manufacturer server 300a in this sequence, the device history information with added CRL information 700 may also be uploaded to the service server 300b. Even in such a case, the sequence is similar to the present sequence. Also, the uploading of the device history information with added CRL information 700 may be conducted from the device 200c periodically, or when triggered by the timing of a specific process.

In S301, the authentication information adding unit 500 of the device 200c consolidates its own device ID, device history information 600, and CRL version information read out from the CRL stored in the authentication information storage unit 205, and applies a signature using the private key of the device 200c to generate the device history information with added CRL information 700. For the signature algorithm, a public-key cryptography algorithm such as an elliptic curve cryptosystem (ECC) may be used. Public-key cryptography other than ECC may also be used.

In S302, the device 200c encrypts the device history information with added CRL information 700 with the shared key shared with the controller 100a.

In S303, the device 200c sends the encrypted device history information with added CRL information 700 to the controller 100a.

In S304, the controller 100a decrypts the encrypted device history information with added CRL information 700 received from the device 200c.

In S305, the controller 100a conducts SSL authentication with the manufacturer server 300a, and shares a session key.

In S306, the controller 100a transmits the controller ID and the device history information with added CRL information 700 to the manufacturer server 300a.

In S307, the manufacturer server 300a verifies the signature 703 of the device history information with added CRL information 700 received from the controller 100a. If the verification result is judged to be a verification error, the process ends. Otherwise, if verification is judged to be successful, the process proceeds to S308.

In S308, the manufacturer server 300a compares the CRL version 702 in the received device history information with added CRL information 700 to the CRL version listed in the CRL stored in the CRL storage unit 304 of the manufacturer server 300a, and checks whether or not the version of the received CRL is up-to-date. If the check result indicates that the version of the received CRL is up-to-date, this means that the controller 100a is distributing an up-to-date CRL to the device 200c, and thus the unauthorized controller determination result corresponding to the controller 100a is taken to be "authorized", the device history information is stored in the server, and the process ends. Otherwise, if the version of the received CRL is not up-to-date, there is a possibility that the controller 100a is not distributing an up-to-date CRL to the device 200c, and thus the unauthorized controller determination result corresponding to the controller 100a is recorded as "unauthorized", and the process proceeds to S309.

In S309, in order to issue a CRL update request to the device 200c, the manufacturer server 300a conducts SSL authentication and connects to the controller 100b other than the controller 100a to which the device 200c is connected.

In S310, the manufacturer server 300a transmits the device ID of the device 200c and the up-to-date CRL to the controller 100b.

In S311, the controller 100b transmits the controller ID and the CRL received from S310 to the device 200c.

In S312, the process is similar to the process of S135, and thus description thereof is omitted.

In S313, the process is similar to the process of S136, and thus description thereof is omitted.

In S314, the process is similar to the process of S137, and thus description thereof is omitted.

In S315, the process is similar to the process of S138, and thus description thereof is omitted.

Figure 32:
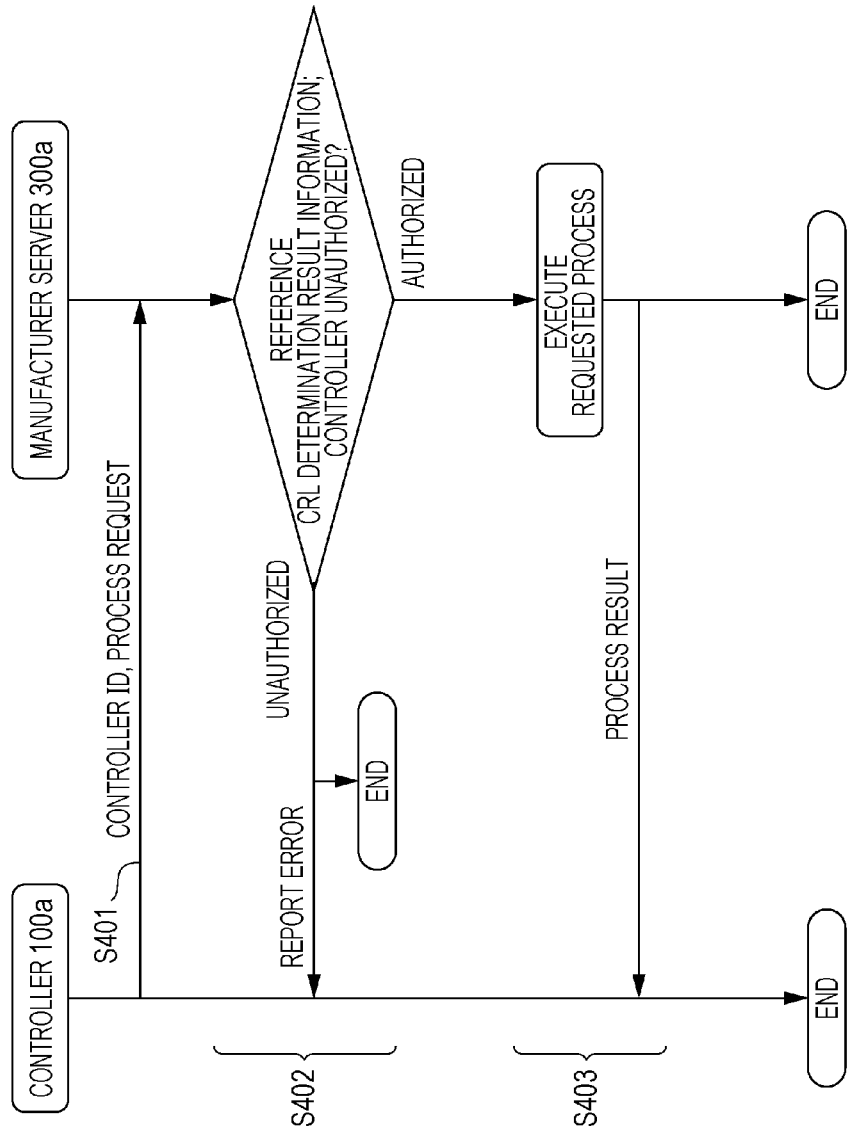
FIG. 32 is a sequence diagram of processing a request from a controller using an unauthorized controller determination result according to the third embodiment.

FIG. 32 is a sequence diagram of processing a request from the controller 100a using an unauthorized controller determination result.

In S401, the controller 100a sends the controller ID and a process request to the manufacturer server 300a. The process request herein refers to a control command for controlling the device 200c or the like, for example.

In S402, the manufacturer server 300a references the unauthorized controller determination result 803 corresponding to the controller 100a, and references whether or not the controller 100a is judged to be "unauthorized". If the reference result indicates that the controller 100a is determined to be "unauthorized", the request from the controller 100a is not processed, and an error report is sent to the controller 100a.

In S403, if the result of referencing the unauthorized controller determination result 803 indicates that the controller 100a is determined to be "authorized", the manufacturer server 300a executes the process requested from the controller 100a, and returns the process result.

In the previous embodiments, the manufacturer server 300a references the up-to-date CRL recorded in the manufacturer server 300a, and checks whether or not the controller ID of the connection host is listed in the up-do-date CRL, and is thereby able to judge whether or not the controller is unauthorized. However, in some cases, it takes time to register a newly discovered unauthorized controller in the up-to-date CRL and publish a new CRL. In the present embodiment, the manufacturer server 300a uses the device history information with added CRL information 700 to references the determined unauthorized controller determination result 803, and thus is able to prevent unauthorized control of device via an unauthorized controller, even during the period before the unauthorized controller is registered in the CRL.

Fourth Embodiment

In a fourth embodiment, the CRL of the controller is updated at the timing of uploading device history information.

Figure 33:
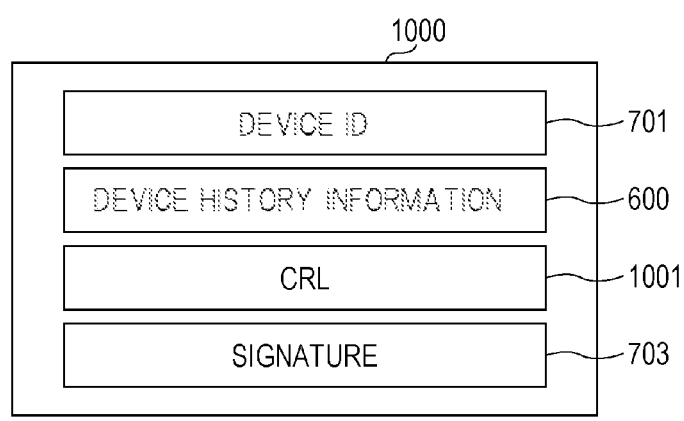
FIG. 33 is a configuration diagram of device history information with added CRL information according to a fourth embodiment.

FIG. 33 is a diagram illustrating device history information with added CRL information 1000 according to the fourth embodiment.

The device history information with added CRL information 1000 differs from the device history information with added CRL information 700 in that a CRL 1001 is provided instead of the CRL version 702. Since the structure of the CRL 1001 is similar to FIG. 5, description thereof is omitted.

Figure 34:
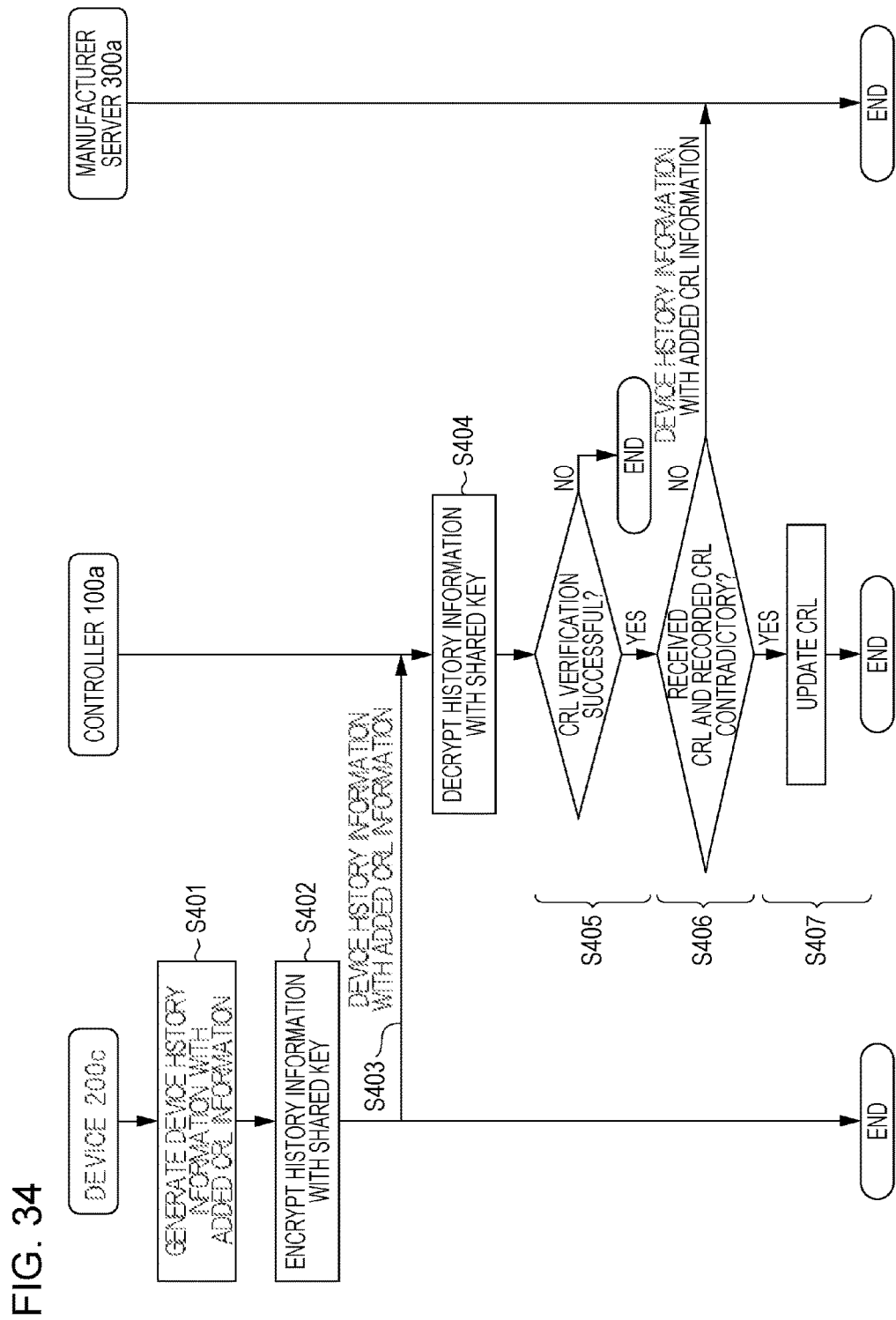
FIG. 34 is a CRL update sequence diagram when uploading device history information with added CRL information according to the fourth embodiment.

FIG. 34 is a diagram illustrating a sequence for the case of updating the CRL of a controller when uploading the device history information with added CRL information 1000. Hereinafter, only the parts different from the third embodiment will be described.

In S401, the process is similar to the process of S301, and thus description thereof is omitted.

In S402, the process is similar to the process of S302, and thus description thereof is omitted.

In S403, the process is similar to the process of S303, and thus description thereof is omitted.

In S404, the process is similar to the process of S304, and thus description thereof is omitted.

In S405, the controller 100a verifies the CRL 1001 in the device history information with added CRL information 1000 received from the device 200c. If verification fails, the process is ended. If verification is successful, the process proceeds to S406.

In S406, the controller 100a compares the CRL 1001 received from the device 200c to the CRL in the authentication information storage unit 104, and verifies whether or not a contradiction exists. Since the method of determining a contradiction is similar to S137, description thereof is omitted. If updating the CRL recorded in the controller 100a is not necessary, the device history information with added CRL information 1000 is sent to the manufacturer server 300a.

In S407, if the result of S406 indicates that the CRL received from the device 200c is more up-to-date, the CRL recorded in the controller 100a is updated with the CRL 1001.

In so doing, it becomes possible to update the CRL recorded in the controller at the timing of uploading device history information to the manufacturer server via the controller.

3. Other Modifications

Although the present disclosure has been described based on the above embodiments, it is needless to say that the present disclosure is not restricted to the above embodiment. The following arrangements are also included in the present disclosure.

(1) In the above embodiments, the controller may acquire a CRL from the server during the device registration processing. Acquisition may be periodically performed outside of device registration processing. Acquisition may also be performed at the server before the next issue date of the CRL.

(2) While the device communicates with the server via the controller, or the device communicates with the content server 300c, to acquire a CRL in the above embodiments, this is not restrictive, and the CRL may be acquired via a mobile terminal connected to the server. Communication between the mobile terminal and the device may be near field communication (NFC) or Bluetooth (a registered trademark) communication.

(3) Although other devices 200 and controllers are notified when a device determines a controller to be unauthorized in the above embodiments, in a case where the devices or controllers that receive the notification have display functions, a display screen to the effect that an unauthorized controller has been detected may be output. Also, in a case where there is no display screen, an error code may be displayed or a lamp made to blink.

Accordingly, the user having the unauthorized controller can confirm the display, and can replace the unauthorized controller.

(4) While challenge-response authentication using a shared key is performed in the above second embodiment, this is not restrictive, and Extensible Authentication Protocol Pre-Shared Key (EAP-PSK) may further be performed using the authentication method described in Request for Comments (RFC) 5191.

(5) The key for encrypted communication may be exchanged at the time of device registration processing in the above first embodiment. Diffie-Hellman (DH) or ECDH may be used as the key exchange method.

(6) In the above embodiments, the controller may display the power consumption of the devices to which connection is to be made, the amount of electric power charged in a battery, and the amount of power generated by a solar generator.

(7) The controller in the above embodiments may be a power distribution board installed in a home.

(8) Communication between the controller and device in the above embodiments may be Wi-Fi, Specified Low Power Wireless, Power Line Communication, or Bluetooth (a registered trademark).

(9) Although the portal server 400 issues CRLs as a certificate authority in the above embodiments, this is not restrictive; the manufacturer server 300*a*, service server 300*b*, and content server 300*c* may serve as certificate authorities and issue CRLs.

(10) While CRLS are issued in the above embodiments including all certificate IDs of public key certificates of unauthorized controllers, this is not restrictive, and an arrangement may be made issuing CRLs regarding just devices which connect to the manufacturer server 300*a*, CRLs regarding devices and controllers relating to services provided by the service server 300*b*, and CRLs regarding just devices which can connect to the content server 300*c*. Further, CRLs may be issued for each device type or each year of manufacture of the device manufactured by the manufacturer of the manufacturer server 300*a*.

(11) In the foregoing embodiments, at the stage when an unauthorized controller is detected, the update of the CRL in device is conducted via another controller which is connected to the device and which is not determined to be unauthorized, but the configuration is not limited thereto. A direct CRL may also be distributed from the manufacturer server 300*a* directly to device, without going through a controller.

(12) In the foregoing embodiments, the CRL information of the device 200*c* is added to the device history information, but the CRL information may also be added to information other than the device history information that is transmitted from the device 200*c* to the manufacturer server 300*a*.

(13) In the foregoing embodiments, after a controller is detected on the basis of the device history information with added CRL information from the device, the manufacturer server 300*a* does not process requests from an unauthorized controller, but the configuration is not limited thereto. A CRL-issuing server may also be notified of the identification information of the unauthorized controller, so that the unauthorized controller is newly registered in the CRL.

(14) The above devices specifically are computer systems configured including a microprocessor, read-only memory (ROM), random access memory (RAM), a hard disk unit, a display unit, a keyboard, a mouse, or the like. A computer program is recorded in the RAM or hard disk unit. The devices realize their functions by the microprocessor operating according to the computer program. The computer program here is configured by combining multiple command codes indicating instructions to the computer, to realize predetermined functions.

(15) Part or all of the components configuring the above device may be configured as a single system large scale integration (LSI). A system LSI is a super-multi-functional LSI manufactured integrating multiple components on a single chip, and specifically is a computer system configured including a microprocessor, ROM, RAM, and so forth. A computer program is recorded in the RAM. The system LSI realizes its functions by the microprocessor operating according to the computer program.

The parts of the components making up the above devices may be individually formed into one chip, or part or all may be included in one chip.

While description has been made regarding a system LSI, there are different names such as integrated circuit (IC), LSI, super LSI, and ultra LSI, depending on the degree of integration. The circuit integration technique is not restricted to LSIs, and dedicated circuits or general-purpose processors may be used to realize the same. A field programmable gate array (FPGA) which can be programmed after manufacturing the LSI, or a reconfigurable processor where circuit cell connections and settings within the LSI can be reconfigured, may be used.

Further, in the event of the advent of an integrated circuit technology which would replace LSIs by advance of semiconductor technology or a separate technology derived therefrom, such a technology may be used for integration of the functional blocks, as a matter of course. Application of biotechnology is a possibility.

(16) Part or all of the components of which the above-described devices may be configured as an IC card detachably mountable to each device or a standalone module. The IC card or module is a computer system configured including a microprocessor, ROM, RAM, and so forth. The IC card or module may include the above-described super-multi-functional LSI. The IC card or module achieves its functions by the microprocessor operating according to the computer program. The IC card or module may be tamper-resistant.

(17) The present disclosure may be the above-described methods, or may be a computer program which realizes these methods by a computer, or may be digital signals made up of the computer program.

The present disclosure may be the computer program or the digital signals recorded in a computer-readable recording medium, such as for example, a flexible disk, a hard disk, a compact disc ROM (CD-ROM), magneto-optical (MO) disk, digital versatile disc (DVD), DVD-ROM, DVD-RAM, Blu-ray Disc (BD, a registered trademark), semiconductor memory, or the like. The present disclosure may also be the digital signals recorded in these recording mediums.

The present disclosure may be an arrangement where the computer program or the digital signals are transmitted over an electric communication line, wireless or cable communication line, a network such as the Internet or the like, data broadcasting, or the like.

The present disclosure may be a computer system having a microprocessor and memory, where the memory records the computer program, and the microprocessor operates according to the computer program.

The present disclosure may also be carried out by another independent computer system, by the program or digital signals being recorded in the recording medium and being transported, or by the program or digital signals being transferred over the network or the like.

(18) The above-described embodiment and the above-described modifications may be combined.

According to the present disclosure, in a system in which a device and a controller connect, even if the device connects to an unauthorized controller, the unauthorized controller may be detected by acquiring a CRL via multiple networks.

What is claimed is:
1. An authentication method in an authentication system including a server, a device, and a first controller that controls the device, the authentication method comprising:
storing, at the device, a first certificate revocation list and device history information, the first certificate revocation list having first age-identifying information;
storing, at the server, a second certificate revocation list, the second certificate revocation list having second age-identifying information;
transmitting, from the device to the first controller, device history information with the first age-identifying information of the first certificate revocation list;
transmitting, from the first controller to the server, the device history information with the first age-identifying information of the first certificate revocation list and added authentication information;

comparing, at the server, the first age-identifying information of the first certificate revocation list to the second age-identifying information of the second certificate revocation list;

if the first age-identifying information is indicated to be older than the second age-identifying information, judging that the first controller is unauthorized; and if the first age-identifying information is indicated to be same as or younger than the second age-identifying information, judging that the first controller is authorized and judging that the first controller is set to receive an updated certificate revocation list from the server, wherein, when the first controller is judged to be unauthorized, the server no longer transmits the updated certificate revocation list to the first controller.

2. The authentication method according to claim 1, wherein when the server judges that the first controller is unauthorized, the server transmits the second certificate revocation list to a second controller connected to the device, the second controller transmits the second certificate revocation list to the device, and the device updates the first certificate revocation list with the second certificate revocation list.

3. The authentication method according to claim 1, wherein when the server judges that the first controller is unauthorized, the server records unauthorized determination information indicating that the first controller is unauthorized, when there is a process request from the first controller, references the unauthorized determination information, and rejects the process request from the first controller, such that the server does not perform a process specified in the process request.

4. The authentication method according to claim 1, wherein when the server judges that the first controller is unauthorized, the server transmits the second certificate revocation list to the device, and the device updates the first certificate revocation list with the second certificate revocation list.

5. The authentication method according to claim 1, wherein the device history information includes authentication information.

6. The authentication method according to claim 1, wherein at least one of the first age-identifying information and the second age-identifying information is a time stamp.

7. An authentication system comprising:

a server;

a device; and a controller that controls the device, wherein the device stores a first certificate revocation list and device history information, the first certificate revocation list having first age-identifying information, the server stores a second certificate revocation list, the second certificate revocation list having second age-identifying information, the device transmits, to the controller, device history information with the first age-identifying information of the first certificate revocation list, the controller transmits, to the server, the device history information with the first age-identifying information of the first certificate revocation list and added authentication information, the server compares the first age-identifying information of the first certificate revocation list to the second age-identifying information of the second certificate revocation list, if the first age-identifying information is indicated to be older than the second age-identifying information, judges that the controller is unauthorized, and if the first age-identifying information is indicated to be same as or younger than the second age-identifying information, judging that the controller is authorized and judging that the controller is set to receive an updated certificate revocation list from the server, wherein, when the controller is judged to be unauthorized, the server no longer transmits the updated certificate revocation list to the controller.

8. A device, connected to the authentication system according to claim 7.

* * * * *